(12) United States Patent
Van der Auwera et al.

(10) Patent No.: US 9,167,269 B2
(45) Date of Patent: Oct. 20, 2015

(54) DETERMINING BOUNDARY STRENGTH VALUES FOR DEBLOCKING FILTERING FOR VIDEO CODING

(75) Inventors: Geert Van der Auwera, San Diego, CA (US); Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 13/532,610

(22) Filed: Jun. 25, 2012

(65) Prior Publication Data

US 2013/0101024 A1 Apr. 25, 2013

Related U.S. Application Data

(60) Provisional application No. 61/551,325, filed on Oct. 25, 2011, provisional application No. 61/554,887, filed on Nov. 2, 2011, provisional application No. 61/579,488, filed on Dec. 22, 2011, provisional application No. 61/589,143, filed on Jan. 20, 2012.

(51) Int. Cl.
*H04B 1/66* (2006.01)
*H04N 7/12* (2006.01)
*H04N 11/02* (2006.01)
*H04N 11/04* (2006.01)
*H04N 19/82* (2014.01)
(Continued)

(52) U.S. Cl.
CPC ............. *H04N 19/82* (2014.11); *H04N 19/117* (2014.11); *H04N 19/136* (2014.11); *H04N 19/18* (2014.11); *H04N 19/186* (2014.11)

(58) Field of Classification Search
None
See application file for complete search history.

(56) References Cited

U.S. PATENT DOCUMENTS 7,903,744 B2   3/2011   Bjontegaard
8,005,151 B2 * 8/2011   Joch et al. ................ 375/240.29
(Continued)

FOREIGN PATENT DOCUMENTS

CN    101106713 A   1/2008
CN    101212665 A   7/2008
(Continued)

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.
(Continued)

*Primary Examiner* — Joseph Ustaris
*Assistant Examiner* — Talha Nawaz
(74) *Attorney, Agent, or Firm* — Shumaker & Sieffert, P.A.

(57) ABSTRACT

A video coder associates a first boundary strength value with an edge in response to determining that a first video block or a second video block is associated with an intra-predicted coding unit (CU), where the edge occurs at a boundary between the first video block and the second video block. The video coder may associate a second or a third boundary strength value with the edge when neither the first video block nor the second video block is associated with an intra-predicted CU. The video coder may apply one or more deblocking filters to samples associated with the edge when the edge is associated with the first boundary strength value or the second boundary strength value. The third boundary strength value indicates that the deblocking filters are turned off for the samples associated with the edge.

34 Claims, 14 Drawing Sheets

(51) Int. Cl.
*H04N 19/117* (2014.01)
*H04N 19/136* (2014.01)
*H04N 19/186* (2014.01)
*H04N 19/18* (2014.01)

(56) References Cited

U.S. PATENT DOCUMENTS

| | | | |
|---|---|---|---|
| 2006/0126962 A1* | 6/2006 | Sun | 382/268 |
| 2008/0144722 A1* | 6/2008 | Park et al. | 375/240.25 |
| 2009/0116546 A1* | 5/2009 | Park et al. | 375/240.01 |
| 2009/0245351 A1* | 10/2009 | Watanabe | 375/240.03 |
| 2010/0322304 A1* | 12/2010 | Lee et al. | 375/240.03 |
| 2011/0194614 A1 | 8/2011 | Norkin et al. | |
| 2011/0222607 A1 | 9/2011 | An et al. | |

FOREIGN PATENT DOCUMENTS

| | | |
|---|---|---|
| TW | 201119398 | 6/2011 |
| TW | 201130306 | 9/2011 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Hsu, et al., "Deblocking Filter with Reduced Pixel Line Buffers for LCU-based Processing," JCTVC-F053, Source: MediaTek Inc., ITU-T SG16 WP3 and ISO/IEC JTC1/SC291WG11, 6th Meeting: Torino, IT, Jul. 14-22, 2011, 7 pp.

International Preliminary Report on Patentability—PCT/US2012/061693, The International Bureau of WIPO—Geneva, Switzerland, Jan. 31, 2014, 11 pp.

International Search Report and Written Opinion—PCT/US2012/061693—ISA/EPO—Jan. 21, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kotra et al., "Deblocking boundary strength and filtering process Simplifications", JCT-VC Meeting; MPEG Meeting; Nov. 21-30, 2011; Geneva; (Joint Collaborative Team on Video Coding of 180/IEC JTC1/SC291WG11 and ITU-T SG16); URL:HTTP://WFTP3.Itu.Int/Av-Arch/Jctvc-Site/,No. JCTVC-G638, XP030110622, 5 pp.

List, et al.,"Adaptive deblocking filter", IEEE Transactions on Circuits and Systems for Video Technology, IEEE Service Center, Piscataway, NJ, US, vol. 13, No. 7, Jul. 3, 2003, pp. 614-619, XP011221094.

Narroschke, et al., "Decisions for deblocking", Mar. 10, 2011, No. JCTVC-E251, Mar. 10, 2011, XP030008757, ISSN: 0000-0007, 11 pp.

Norkin, et al., "Development of HEVC deblocking filter", JCT-VC Meeting; MPEG Meeting; Jan. 20-28, 2011; Daegu; (Joint Collaborative Team on Video Coding of ISO/IEC JTC1/SC29/WG11AND ITU-T SG16); URL: http://wftp3.1tu.int/av-arch/jctvc-site/, No. JCTVC-D377, XP030008416,ISSN: 0000-0013, 4 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Second Written Opinion from International Application No. PCT/US2012/061693, dated Sep. 18, 2013, 8 pp.

* cited by examiner

| | | | | | | | | | |
|---|---|---|---|---|---|---|---|---|---|
| | $p_{3,0}$ | $p_{2,0}$ | $p_{1,0}$ | $p_{0,0}$ | $q_{0,0}$ | $q_{1,0}$ | $q_{2,0}$ | $q_{3,0}$ | |
| | $p_{3,1}$ | $p_{2,1}$ | $p_{1,1}$ | $p_{0,1}$ | $q_{0,1}$ | $q_{1,1}$ | $q_{2,1}$ | $q_{3,1}$ | |
| | $p_{3,2}$ | $p_{2,2}$ | $p_{1,2}$ | $p_{0,2}$ | $q_{0,2}$ | $q_{1,2}$ | $q_{2,2}$ | $q_{3,2}$ | |
| A | $p_{3,3}$ | $p_{2,3}$ | $p_{1,3}$ | $p_{0,3}$ | $q_{0,3}$ | $q_{1,3}$ | $q_{2,3}$ | $q_{3,3}$ | B |
| | $p_{3,4}$ | $p_{2,4}$ | $p_{1,4}$ | $p_{0,4}$ | $q_{0,4}$ | $q_{1,4}$ | $q_{2,4}$ | $q_{3,4}$ | |
| | $p_{3,5}$ | $p_{2,5}$ | $p_{1,5}$ | $p_{0,5}$ | $q_{0,5}$ | $q_{1,5}$ | $q_{2,5}$ | $q_{3,5}$ | |
| | $p_{3,6}$ | $p_{2,6}$ | $p_{1,6}$ | $p_{0,6}$ | $q_{0,6}$ | $q_{1,6}$ | $q_{2,6}$ | $q_{3,6}$ | |
| | $p_{3,7}$ | $p_{2,7}$ | $p_{1,7}$ | $p_{0,7}$ | $q_{0,7}$ | $q_{1,7}$ | $q_{2,7}$ | $q_{3,7}$ | |

FIG. 9

DETERMINING BOUNDARY STRENGTH VALUES FOR DEBLOCKING FILTERING FOR VIDEO CODING

This application claims the benefit of U.S. Provisional Application No. 61/551,325, filed Oct. 25, 2011, U.S. Provisional Application No. 61/554,887, filed Nov. 2, 2011, U.S. Provisional Application No. 61/579,488, filed Dec. 22, 2011, and U.S. Provisional Application No. 61/589,143, filed Jan. 20, 2012, the entire content of which are hereby incorporated by reference.

TECHNICAL FIELD

This disclosure relates to video coding and, more particularly, filtering of decoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for applying a deblocking filter to an edge that occurs between a first video block and a second video block. Applying the deblocking filter to the edge may reduce the appearance of visual artifacts caused by block-based coding. As described herein, a video coder may associate a first boundary strength value with an edge in response to determining that a first video block or a second video block is associated with an intra-predicted coding unit (CU), where the edge occurs at a boundary between the first video block and the second video block. The video coder may associate a second or a third boundary strength value with the edge when neither the first video block nor the second video block is associated with an intra-predicted CU. The video coder may apply one or more deblocking filters to samples associated with the edge when the edge is associated with the first boundary strength value or the second boundary strength value. The third boundary strength value indicates that the deblocking filters are turned off for the samples associated with the edge.

This disclosure describes a method of coding video data. The method comprises associating a first boundary strength value with an edge in response to determining that a first video block or a second video block is associated with an intra-predicted coding unit (CU), the edge occurring at a boundary between the first video block and the second video block. The method also comprises associating a second boundary strength value with the edge in response to determining that the first video block and the second video block are not associated with an intra-predicted CU and that one or more additional conditions are satisfied. In addition, the method comprises associating a third boundary strength value with the edge in response to determining that the first video block and the second video block are not associated with an intra-predicted CU and that the one or more additional conditions are not satisfied. The method also comprises applying one or more deblocking filters to samples associated with the edge when the edge is associated with the first boundary strength value or the second boundary strength value, but not the third boundary strength value.

In addition, this disclosure describes a video coding apparatus comprising one or more processors configured to associate a first boundary strength value with an edge in response to determining that a first video block or a second video block is associated with an intra-predicted coding unit (CU), the edge occurring at a boundary between the first video block and the second video block. The one or more processors are configured to associate a second boundary strength value with the edge in response to determining that the first video block and the second video block are not associated with an intra-predicted CU and that one or more additional conditions are satisfied. The one or more processors are configured to associate a third boundary strength value with the edge in response to determining that the first video block and the second video block are not associated with an intra-predicted CU and that the one or more additional conditions are not satisfied. In addition, the one or more processors are configured to apply a deblocking filter to samples associated with the edge when the edge is associated with the first boundary strength value or the second boundary strength value, but not the third boundary strength value.

This disclosure also describes a video coding apparatus that comprises means for associating a first boundary strength value with an edge in response to determining that a first video block or a second video block is associated with an intra-predicted coding unit (CU), the edge occurring at a boundary between the first video block and the second video block. The video coding apparatus also comprises means for associating a second boundary strength value with the edge in response to determining that the first video block and the second video block are not associated with an intra-predicted CU and that one or more additional conditions are satisfied. In addition, the video coding apparatus comprises means for associating a third boundary strength value with the edge in response to determining that the first video block and the second video block are not associated with an intra-predicted CU and that the one or more additional conditions are not satisfied. The video coding apparatus also comprises means for applying one or more deblocking filters to samples associated with the edge when the edge is associated with the first boundary strength value or the second boundary strength value, but not the third boundary strength value.

This disclosure also describes a computer program product that comprises one or more computer-readable storage media that store computer-executable instructions that, when executed, cause one or more processors to associate a first boundary strength value with an edge in response to determining that a first video block or a second video block is associated with an intra-predicted coding unit (CU). The edge occurs at a boundary between the first video block and the second video block. The instructions also cause the one or more processors to associate a second boundary strength value with the edge in response to determining that the first video block and the second video block are not associated with an intra-predicted CU and that one or more additional conditions are satisfied. The instructions also cause the one or more processors to associate a third boundary strength value with the edge in response to determining that the first video block and the second video block are not associated with an intra-predicted CU and that the one or more additional conditions are not satisfied. In addition, the instructions cause the one or more processor to apply one or more deblocking filters to samples associated with the edge when the edge is associated with the first boundary strength value or the second boundary strength value, but not the third boundary strength value.

The details of one or more examples are set forth in the accompanying drawings and the description below. Other features, objects, and advantages will be apparent from the description and drawings, and from the claims.

BRIEF DESCRIPTION OF DRAWINGS

FIG. 9 is a conceptual diagram that indicates example labels of samples at a vertical edge between a first video block "A" and a second video block "B."

DETAILED DESCRIPTION

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

An edge may occur at a boundary between a first video block and a second video block. In this disclosure, the term "video block" may be used to refer to a two-dimensional (2D) block of samples. For example, the first and second video blocks may be decoded video blocks associated with neighboring coding units (CUs), or transform units (TU) or prediction units (PU) of the CUs. A video coder may associate a first boundary strength value with the edge in response to determining that the first video block or the second video block is associated with an intra-predicted CU. The video coder may associate a second or a third boundary strength value with the edge when neither the first nor the second video block is associated with an intra-predicted CU. When the edge is associated with the first boundary strength value or the second boundary strength value, the video coder may apply one or more deblocking filters to samples associated with the edge. The samples associated with the edge may include samples in lines of samples that run perpendicular to the edge. The deblocking filters may reduce the visibility of blocking artifacts associated with the edge. Blocking artifacts may include sharp discontinuities in brightness (luma) and/or color (chroma) samples that were not originally present in the video blocks. As used herein, the term "sample" may be used interchangeably with the term "pixel."

Associating the edge with the first boundary strength value in response to determining that the first video block or the second video block are associated with an intra-predicted CU may simplify a process of associating a boundary strength value with the edge, and thereby may decrease the complexity and increase performance of the video coder. In contrast, if the video coder were to make additional determinations about which boundary strength value to associate with the edge after determining that the first video block or the second video block is associated with an intra-predicted CU, the video coder may be more complicated and may have lower performance.

Figure 1:
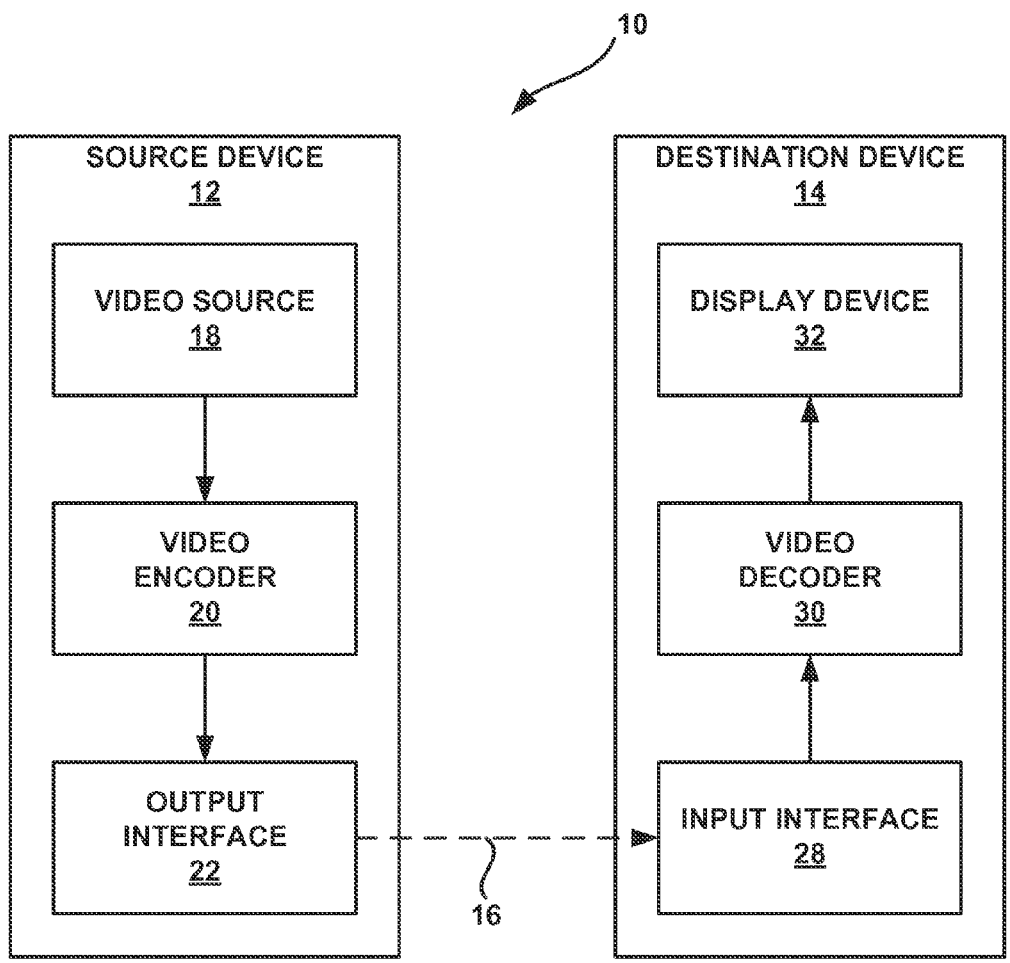
FIG. 1 is a block diagram illustrating an example video coding system that may utilize the techniques of this disclosure.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, a mobile computing device, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), FTP servers, network attached storage (NAS) devices, and local disk drives. Destination device 14 may access the encoded video data through any standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures.

To generate a coded picture, video encoder 20 may partition a picture into equally-sized video blocks. Each of the video blocks is associated with a treeblock. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on each non-partitioned CU of a treeblock. A non-partitioned CU is a CU whose video block is not partitioned into video blocks for other CUs. As part of performing an encoding operation on a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. When video encoder 20 uses inter prediction to generate the predicted video block of the PU, video encoder 20 may generate the predicted video block of the PU based on decoded values of pictures other than the picture associated with the PU. If video encoder 20 uses intra prediction to generate predicted video blocks of the PUs of a CU, the CU is an intra-predicted CU.

When video encoder 20 uses inter prediction to generate a predicted video block for a PU, video encoder 20 may generate motion information for the PU. The motion information for a PU may indicate a portion of another picture that corresponds to the video block of the PU. In other words, the motion information for a PU may indicate a "reference sample" for the PU. Video encoder 20 may generate the predicted video block for the PU based on the portions of the other pictures that are indicated by the motion information for the PU. If video encoder 20 uses inter prediction to generate predicted video blocks for the PUs of a CU, the CU is an inter-predicted CU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block. Video coder 20 may perform transform operations on each TU of the CU.

When video encoder 20 performs the transform operation on a TU, video encoder 20 may apply one or more transforms to a residual video block associated with the TU to generate one or more transform coefficient blocks (i.e., blocks of transform coefficients) associated with the TU. Conceptually, a transform coefficient block may be a two-dimensional (2D) matrix of transform coefficients.

After generating a transform coefficient block, video encoder 20 may perform a quantization operation on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may scan the quantized transform coefficients to produce a one-dimensional vector of transform coefficient levels. Video encoder 20 may entropy encode the one-dimensional vector. Video encoder 20 may also entropy encode other syntax elements associated with the video data.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include entropy encoded syntax structures, such as entropy-encoded transform coefficient blocks, motion information, and so on.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may determine the video blocks of CUs based on the syntax elements in the bitstream.

After reconstructing the video block of a CU, video decoder 30 may perform a deblocking operation to reduce blocking artifacts associated with the CU. To perform this deblocking operation, video decoder 30 may identify TU edges and PU edges associated with the CU. The TU edges may correspond to segments of or complete edges of the residual video blocks associated with the TUs of the CU. The PU edges may correspond to segments of or complete edges of the predicted video blocks associated with the PUs of the CU. The blocking artifacts associated with the CU tend to occur at the TU edges and the PU edges associated with the CU.

After identifying the TU and PU edges, video decoder 30 may associate boundary strength values with the TU and PU edges. As described below, video decoder 30 may use the boundary strength values associated with the TU and PU edges to determine whether and how to apply deblocking filters to samples associated with the TU and PU edges.

In accordance with the techniques of this disclosure, video decoder 30 may associate a first boundary strength value with an edge in response to determining that a first video block or a second video block is associated with an intra-predicted CU. The edge may be a TU edge or PU edge that occurs at a boundary between the first video block and the second video block. Video decoder 30 may associate a second boundary strength value with the edge in response to determining that the first video block and the second video block are not associated with an intra-predicted CU and that one or more additional conditions are satisfied. Video decoder 30 may associate a third boundary strength value with the edge in response to determining that the first video block and the second video block are not associated with an intra-predicted CU and that the one or more additional conditions are not satisfied. Video decoder 30 may apply one or more deblocking filters to samples associated with the edge when the edge is associated with the first boundary strength value or the second boundary strength value, but not the third boundary strength value.

Video encoder 20 may perform a similar deblocking operation to reduce blocking artifacts in reconstructed video blocks associated with the CU prior to storing the reconstructed video blocks in a decoded picture buffer. Thus, a "video coder" (i.e., a video encoder or a video decoder) may perform the deblocking operation described above.

Figure 2:
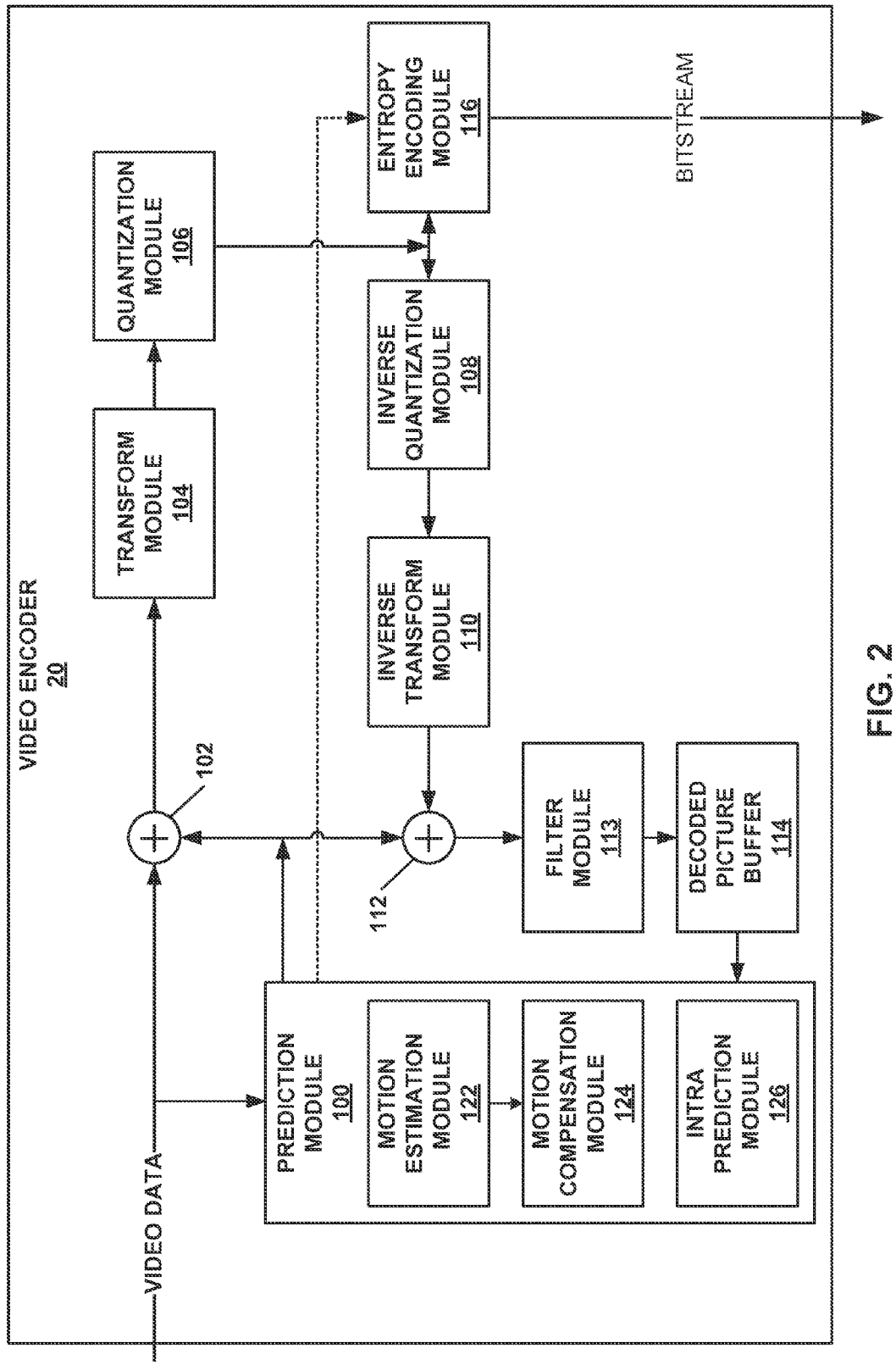
FIG. 2 is a block diagram illustrating an example video encoder that may implement the techniques of this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes a motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Motion estimation module 122 and motion compensation module 124 may perform inter prediction on each PU of the CU. Inter prediction may provide temporal compression. By performing inter prediction on a PU, motion estimation module 122 and motion compensation module 124 may generate prediction data for the PU based on decoded samples of reference pictures other than the picture associated with the CU. The prediction data for the PU may include a predicted video block and various syntax elements.

Furthermore, when motion estimation module 122 performs a motion estimation operation with regard to a PU, motion estimation module 122 may generate one or more motion vectors for the PU. For instance, slices may be intra slices (i.e., I-slices), predicted slices (i.e., P-slices), or bi-predicted slices (i.e., B-slices). Motion estimation module 122 and motion compensation module 124 may perform different operations for a PU of a CU depending on whether the PU is in an I-slice, a P-slice, or a B-slice. In an I-slice, all PUs are intra predicted. Hence, if the PU is in an I-slice, motion estimation module 122 and motion compensation module 124 do not perform inter prediction on the PU.

If the PU is in a P-slice, the picture containing the PU is associated with a list of reference pictures referred to as "list 0." Each of the reference pictures in list 0 contains samples that may be used for inter prediction of subsequent pictures in decoding order. When motion estimation module 122 performs the motion estimation operation with regard to a PU in a P-slice, motion estimation module 122 may search the reference pictures in list 0 for a reference sample for the PU. The reference sample of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference sample of a PU in a P-slice, motion estimation module 122 may generate a reference index that indicates the reference picture in list 0 containing the reference sample and a motion vector that indicates a spatial displacement between the PU and the reference sample. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference sample values may be interpolated from integer-position sample values in the reference picture. Motion estimation module 122 may output motion information for the PU to entropy encoding module 116 and motion compensation module 124. The motion information for the PU may include the reference index and the motion vector of the PU. Motion compensation module 124 may use the motion information of a PU to identify and retrieve the reference sample of the PU.

If the PU is in a B-slice, the picture containing the PU may be associated with two lists of reference pictures, referred to as "list 0" and "list 1." Each of the reference pictures in list 0 contains samples that may be used for inter prediction of subsequent pictures in decoding order. The reference pictures in list 1 occur before the picture in decoding order but after the picture in presentation order. In some examples, a picture containing a B-slice may be associated with a list combination that is a combination of list 0 and list 1.

Furthermore, if the PU is in a B-slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference sample for the PU. Motion estimation module 122 may then generate a reference index that indicates the reference picture in list 0 or list 1 that contains the reference sample and a motion vector that indicates a spatial displacement between the PU and the reference sample. Motion estimation module 122 may output syntax elements that indicate the motion information for the PU to entropy encoding module 116 and motion compensation module 124. The motion information for the PU may include the reference index, a prediction direction indicator, and the motion vector of the PU. The prediction direction indicator may indicate whether the reference index indicates a reference picture in list 0 or list 1. Motion compensation module 124 may use the motion information of the PU to identify and retrieve the reference sample of the PU.

When motion estimation module 122 performs bi-directional prediction for a PU, motion estimation module 122 may search the reference pictures in list 0 for a reference sample for the PU and may also search the reference pictures in list 1 for another reference sample for the PU. Motion estimation module 122 may then generate reference indexes that indicate the reference pictures in list 0 and list 1 containing the reference samples and motion vectors that indicate spatial displacements between the reference samples and the PU. Motion estimation module 122 may output syntax elements that indicate the motion information of the PU to entropy encoding module 116 and motion compensation module 124. The motion information for the PU may include the reference indexes and the motion vectors of the PU. Motion compensation module 124 may use the motion information to identify and retrieve the reference sample of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a quadtree node for a CU associated with the PU, a value that indicates to video decoder 30 that the PU has the same motion information as the neighboring PU. In another example, motion estimation module 122 may identify, in a quadtree node associated with the CU associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to predict the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I-slices, P-slices, and B-slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. Filter module 113 may perform various deblocking operations. For example, filter module 113 may perform the example deblocking operation illustrated in FIG. 4. In other examples, filter module 113 may perform deblocking operations that are different than the example deblocking operation illustrated in FIG. 4.

After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

In this way, after filter module 113 applies a deblocking filter to the samples associated with an edge, prediction module 100 may generate a predicted video block based at least in part on the samples associated with the edge. Video encoder 20 may output a bitstream that includes one or more syntax elements whose values are based at least in part on the predicted video block.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

If the entropy encoding module 116 is performing a CAVLC operation, the context model may map coefficients to corresponding codewords. Codewords in CAVLC may be constructed such that relatively short codes correspond to more probable symbols, while relatively long codes correspond to less probable symbols. Selection of an appropriate context model may impact coding efficiency of the entropy encoding operation.

Figure 3:
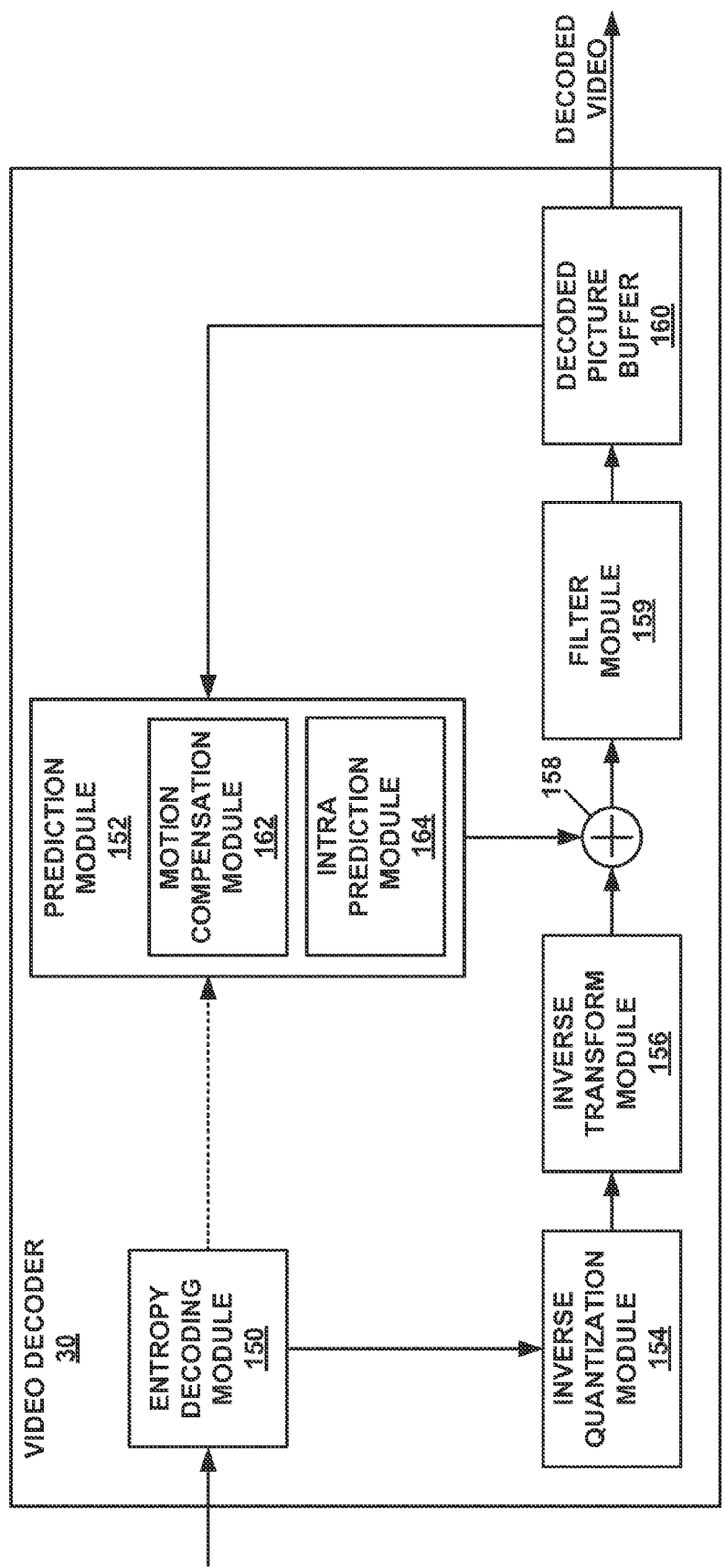
FIG. 3 is a block diagram illustrating an example video decoder that may implement the techniques of this disclosure.

FIG. 3 is a block diagram that illustrates an example video decoder 30 that may implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform an entropy decoding operation, such as a CAVLC decoding operation, on the coded slice header to recover the slice header.

After extracting the slice data from coded slice NAL units, entropy decoding module 150 may extract coded treeblocks from the slice data. Entropy decoding module 150 may then extract coded CUs from the coded treeblocks. Entropy decoding module 150 may perform parsing operations that extract syntax elements from the coded CUs. The extracted syntax elements may include entropy-encoded transform coefficient blocks. Entropy decoding module 150 may then perform entropy decoding operations on the syntax elements. For instance, entropy decoding module 150 may perform CABAC operations on the transform coefficient blocks.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

If a PU of the CU was encoded using inter prediction, motion compensation module 162 may perform motion compensation to generate a predicted video block for the PU. Motion compensation module 162 may use motion information for the PU to identify a reference sample for the PU. The reference sample of a PU may be in a different temporal picture than the PU. The motion information for the PU may include a motion vector, a reference picture index, and a prediction direction. Motion compensation module 162 may use the reference sample for the PU to generate the predicted video block for the PU. In some examples, motion compensation module 162 may predict the motion information for the PU based on motion information of PUs that neighbor the PU. In this disclosure, a PU is an inter-predicted PU if video encoder 20 uses inter prediction to generate the predicted video block of the PU.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to predict the intra prediction mode of the PU.

In some instances, the syntax elements may indicate that intra prediction module 164 is to use the intra prediction mode of another PU to predict the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform a deblocking operation to reduce blocking artifacts associated with the CU. Filter module 159 may perform various deblocking operations to reduce blocking artifacts associated with the CU. For example, filter module 159 may perform the example deblocking operation illustrated in FIG. 4. In other examples, filter module 159 may perform deblocking operations that are different than the deblocking operation illustrated in FIG. 4.

Decoded picture buffer 160 may store decoded samples for pictures of the video data. Thus, after filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
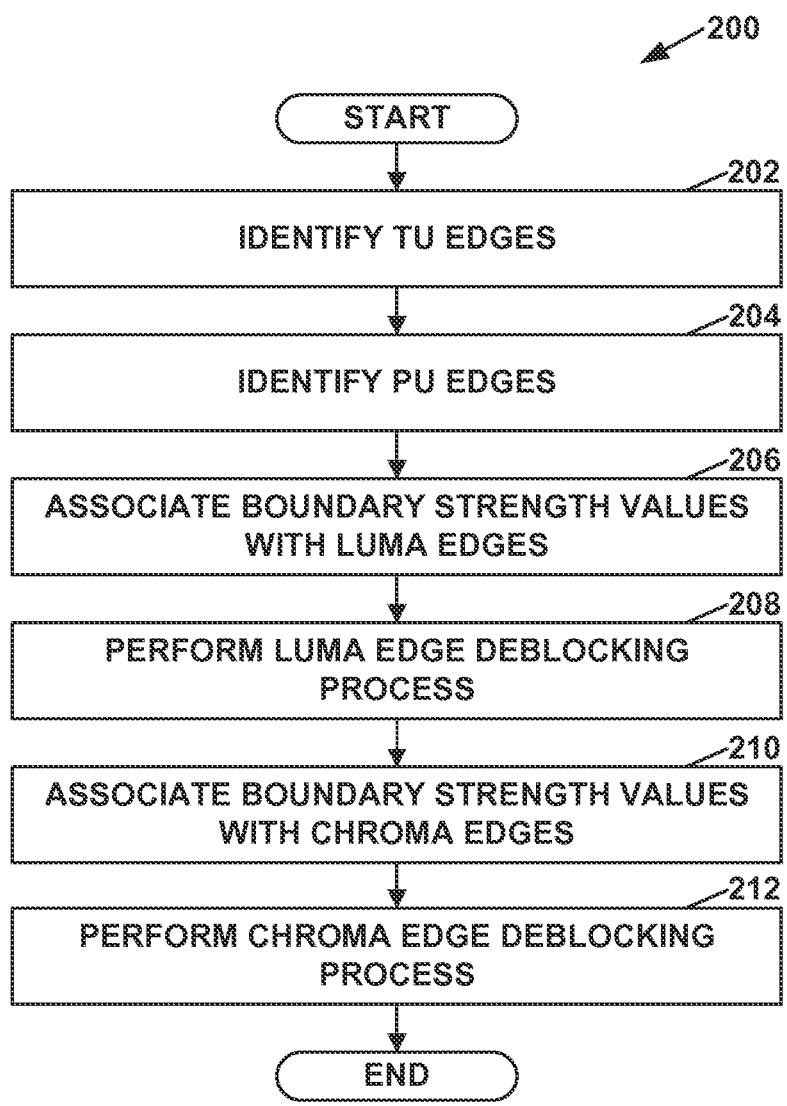
FIG. 4 is a flowchart that illustrates an example deblocking operation to reduce blocking artifacts associated with a coding unit.

FIG. 4 is a flowchart that illustrates an example operation 200 to reduce blocking artifacts associated with a CU. A video coder, such as video encoder 20 or a video decoder 30, may perform operation 200. In other examples, the video coder may use operations other than operation 200 to reduce blocking artifacts associated with the CU. For instance, in other examples, the video coder may perform an operation to reduce blocking artifacts in which the video coder performs more, fewer, or different steps than operation 200. In other examples, the video coder may perform the steps of operation 200 in different orders or in parallel.

After the video coder starts operation 200, the video coder may identify TU edges associated with a current CU (202). The current CU is a CU that the video coder is currently coding (i.e., encoding or decoding). For ease of explanation, this disclosure may refer to the video block associated with the current CU as the current CU video block. The edges associated with the current CU video block may correspond to edges of PUs and TUs of the current CU. Furthermore, the edges associated with the current CU video block may be luma edges and chroma edges. A luma edge may be an edge at a boundary between blocks of luma samples. A chroma edge may be an edge at a boundary between blocks of chroma samples. The video coder may identify the TU edges based on data in a residual quadtree of the current CU.

In addition, the video coder may identify PU edges associated with the current CU (204). The video coder may identify the PU edges in various ways. For example, the video coder may identify PU edges based on a PU partitioning mode of the current CU and a filter internal edges flag associated with the current CU. The filter internal edges flag may indicate whether deblocking is enabled for internal edges of the current CU. The internal edges of the current CU are edges that do not occur at a boundary between the video block of the current CU and a video block of a neighboring CU.

After identifying the TU edges and PU edges (i.e., the edges) associated with the current CU, the video coder may associate boundary strength values with the luma edges (206). The video coder may associate boundary strength values with the luma edges in various ways. For example, the video coder may perform the example operation illustrated in FIG. 5 to associate a boundary strength value with a luma edge. In other examples, the video coder may perform operations different than the example of FIG. 5 to associate a boundary strength value with a luma edge. After associating the edges with boundary strength values, the video coder may perform a luma edge deblocking process (208). The luma edge deblocking process may reduce blocking artifacts in luminance samples. The video coder may perform various luma edge deblocking processes. For example, the video coder may perform the example luma edge deblocking process illustrated in FIG. 7. In other examples, the video coder may perform luma edge deblocking processes that are different than the example luma edge deblocking process illustrated in FIG. 7.

In addition, the video coder may associate boundary strength values with chroma edges (210). The video coder may associate boundary strength values with chroma edges in various ways. For example, the video coder may perform the example operation illustrated in FIG. 6 to associate a boundary strength value with a chroma edge. In other examples, the video coder may perform operations different than the example of FIG. 6 to associate a boundary strength value with a chroma edge.

The video coder may then perform a chroma edge deblocking process (210). The chroma edge deblocking process may reduce blocking artifacts in chrominance samples. The video coder may perform various chroma edge deblocking processes. For example, the video coder may perform the example chroma edge deblocking process illustrated in FIG. 11. In other examples, the video coder may perform chroma edge deblocking processes that are different than the example chroma edge deblocking process illustrated in FIG. 11.

Figure 5:
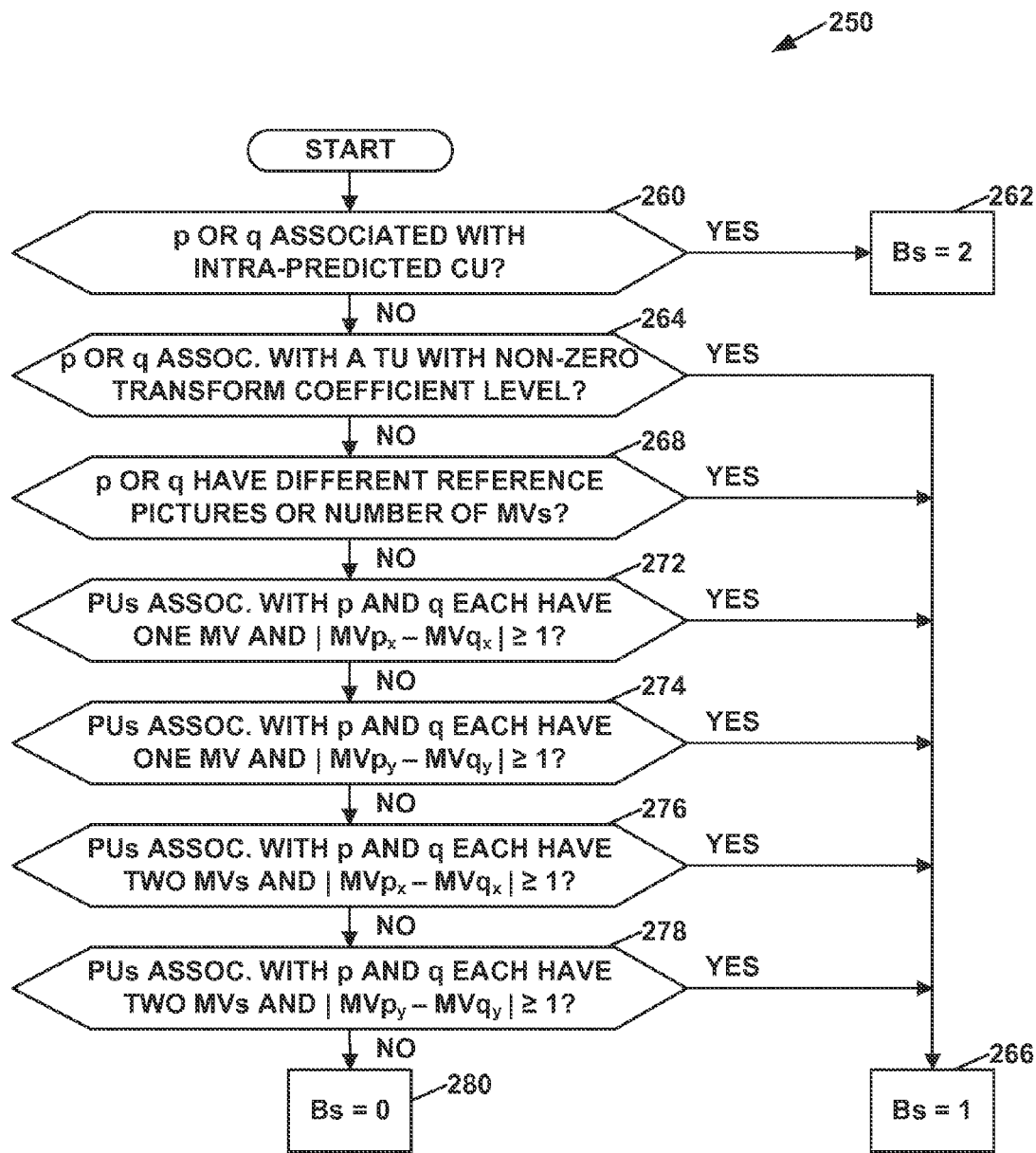
FIG. 5 is a flowchart that illustrates an example operation to associate a boundary strength value with a luma edge between two video blocks.

FIG. 5 is a flowchart that illustrates an example operation 250 to associate a boundary strength value with a luma edge. A video coder, such as video encoder 20 or video decoder 30, may perform operation 250. In other examples, the video coder may use operations other than operation 250 to associate a boundary strength value with a luma edge. For instance, in other examples, the video coder may perform an operation to associate a boundary strength value with a luma edge in which the video coder performs more, fewer, or different steps than operation 250. In other examples, the video coder may perform the steps of operation 250 in different orders or in parallel.

After the video coder starts operation 250, the video coder may determine whether a video block "p" or a video block "q" is associated with an intra-predicted CU (260). The luma edge may occur at a boundary between video block "p" and video block "q."

Video block "q" may be a 4×4 video block within a current CU video block. The current CU video block is a video block associated with a CU (i.e., a current CU) that the video coder is currently coding. Video block "p" may be a 4×4 video block within a neighboring video block. In other examples, video blocks "q" and "p" may be 8×8 video blocks. The neighboring video block may be within the current CU video block or a video block associated with a previously coded CU.

A CU may be an intra predicted CU if the prediction data of the PUs of the CU are generated using intra prediction. Video block "q" may be associated with an intra-predicted CU when the current CU video block (i.e., the video block that contains video block "q") is associated with an intra-predicted CU. Video block "p" may be associated with an intra-predicted CU when the video block that contains video block "p" is associated with an intra-predicted CU.

In response to determining that video block "p" or video block "q" is associated with an intra-predicted CU ("YES" of 260), the video coder may associate the first boundary strength value with the luma edge (262). In the example of FIG. 5, the first boundary strength value is equal to two. A boundary strength value equal to two may indicate that a deblocking filter is on with an offset equal to two.

Conventional video coders may determine whether the luma edge is a CU edge in response to determining that video block "p" or video block "q" is associated with an intra-predicted CU. A CU edge may be an edge that occurs at a boundary between video blocks associated with two different CUs. Such video coders may associate a boundary strength value of "4" with the luma edge in response to determining that the luma edge is a CU edge and may associate a boundary strength value of "3" with the luma edge in response to determining that the luma edge is not a CU edge.

According to the techniques of this disclosure, when a video coder performs operation 250, the video coder associates the first boundary strength value with the luma edge without determining whether the luma edge is a CU edge. Associating the first boundary strength value with the luma edge in response to determining that video block "p" or video block "q" is associated with an intra-predicted CU, instead of making the additional determination regarding whether the luma edge is a CU edge, may reduce the complexity and increase the performance of the video coder.

On the other hand, in response to determining that neither video block "p" nor video block "q" is in an intra-predicted CU ("NO" of 260), the video coder may determine whether video block "p" or video block "q" is associated with a TU that is associated with one or more non-zero transform coefficient levels (264). Video block "p" or video block "q" may be associated with a TU when values of samples in video block "p" or video block "q" are based on a residual video block associated with the TU.

In response to determining that either video block "p" or video block "q" is associated with a TU that is associated with one or more non-zero transform coefficient levels ("YES" of 264), the video coder may associate a second boundary strength value (Bs) with the luma edge (266). In the example of FIG. 5, the second boundary strength value is equal to one. A boundary strength value equal to one may indicate that a deblocking filter is on with an offset equal to zero. Conventionally, video coders may associate a boundary strength value of two with the luma edge in response to determining that either video block "p" or video block "q" is associated with a TU that is associated with one or more non-zero transform coefficients.

Otherwise, in this example, if neither video block "p" nor video block "q" is associated with a TU that is associated with one or more non-zero transform coefficient levels ("NO" of 264), the video coder may determine whether video block "p" or video block "q" are associated with PUs that have different reference pictures or that have different numbers of motion vectors (MVs) (268). Video block "p" or video block "q" may be associated with a PU when values of samples in video block "p" or video block "q" are based on a predicted video block associated with the PU.

In response to determining that video block "p" or video block "q" are associated with PUs that have different reference pictures or that have different numbers of motion vectors ("YES" of 268), the video coder may associate the second boundary strength value (e.g., 1) with the luma edge (266).

In addition, the video coder may determine whether video block "p" and video block "q" are each associated with PUs that have one motion vector and the absolute value of the difference between the horizontal components of the motion vector of the PU associated with video block "p" (MVp) and the motion vector of the PU associated with video block "q" ($MVq_x$) is greater than or equal to one (272). In response to determining that video block "p" and video block "q" are each associated with PUs that have one motion vector and the absolute value of the difference between $MVq_x$ and $MVp_x$ is greater than or equal to one ("YES" of 272), the video coder may associate the second boundary strength value (e.g., 1) with the luma edge (266).

In addition, the video coder may determine whether video block "p" and video block "q" are each associated with PUs that have one motion vector and the absolute value of the difference between the vertical components of the motion vector of the PU associated with video block "p" ($MVp_y$) and the motion vector of the PU associated with video block "q" ($MVq_y$) is greater than or equal to one (274). In response to determining that video block "p" and video block "q" are each associated with PUs that have one motion vector and the absolute value of the difference between $MVp_y$ and $MVq_y$ is greater than or equal to one ("YES" of 274), the video coder may associate the second boundary strength value (e.g., 1) with the luma edge (266).

In addition, the video coder may determine whether both the PU associated with video block "q" and PU associated with video block "p" have two motion vectors and, for at least one pair of the motion vectors, the absolute value of the difference between the horizontal components of the motion vectors ($MVp_x$, $MVq_x$) is greater than or equal to one (276). In response to determining that both the PU associated with video block "q" and the PU associated with video block "p" have two motion vectors and, for at least one pair of the motion vectors, the absolute value of the difference between $MVp_x$ and $MVq_x$ is greater than or equal to one ("YES" of 276), the video coder may associate the second boundary strength value (e.g., 1) with the luma edge (266).

In addition, the video coder may determine whether both the PU associated with video block "q" and the PU associated with video block "p" have two motion vectors and, for at least one pair of the motion vectors, the absolute value of the difference between the vertical components of the motion vectors ($MVp_y$, $MVq_y$) is greater than or equal to one (278). In response to determining that both the PU associated with video block "q" and the PU associated with video block "p" have two motion vectors and, for at least one pair of the motion vectors, the absolute value of the difference between the vertical components of the motion vectors ($MVp_y$, $MVq_y$) is greater than or equal to one ("YES" of 278), the video coder may associate the second boundary strength value (e.g., 1) with the luma edge (266).

Otherwise, if none of the conditions in steps 268-278 evaluate to true, the video coder may associate the luma edge with a third boundary strength value (280). In the example of FIG. 5, the third boundary strength value is equal to zero. Thus, in the example of FIG. 5, the video coder may only associate boundary strength values of one or zero with the luma edge when video block "p" and video block "q" are associated with inter-predicted CUs. As described below, the video coder does not apply a deblocking filter to an edge if the boundary strength value associated with the edge is the third boundary strength value (e.g., zero).

Steps 268-278 may be additional checks to determine differences between samples in video block "q" and samples in video block "p." If the checks of steps 268-278 evaluate to true, the samples in video block "q" and the samples in video block "p" may have some differences. Otherwise, the samples in video block "q" and the samples in video block "p" may have little to no differences, accordingly the edge may be associated with a boundary strength value of zero and no deblocking filter is applied to the samples associated with the edge.

This disclosure describes the example of FIG. 5 as being performed with regard to a luma edge. However, in other examples, an operation similar to operation 250 may be performed with regard to chroma edges.

Figure 6:
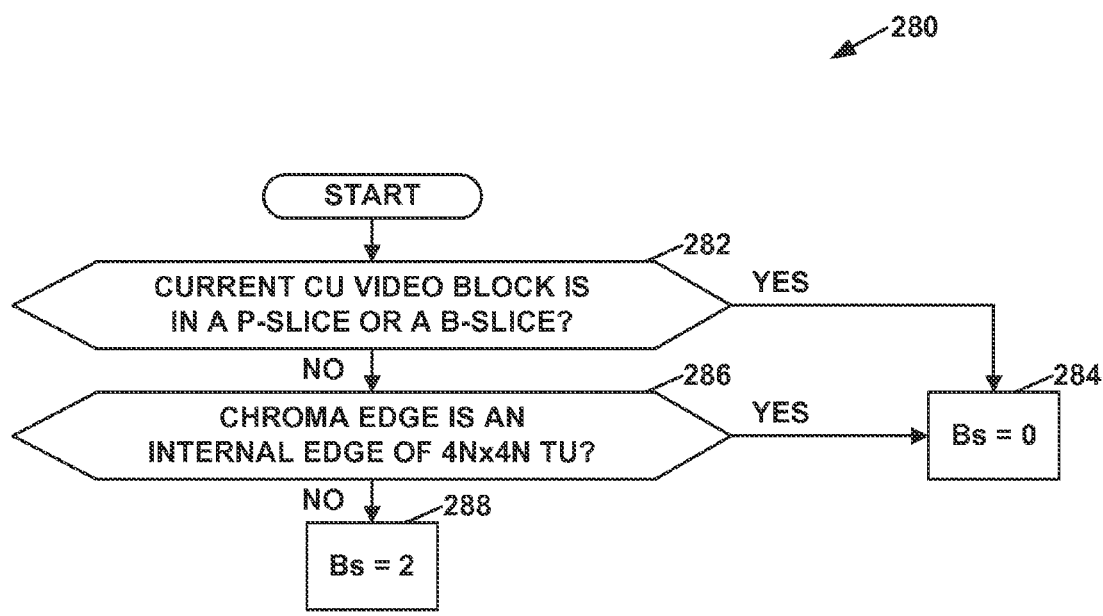
FIG. 6 is a flowchart that illustrates an example operation to associate a boundary strength value with a chroma edge between two video blocks.

FIG. 6 is a flowchart that illustrates an example operation 280 to associate a boundary strength value with a chroma edge between two video blocks. A video coder, such as video encoder 20 or video decoder 30, may perform operation 280. In other examples, the video coder may use operations other than operation 280 to associate a boundary strength value with a chroma edge. For instance, in other examples, the video coder may perform an operation to associate a boundary strength value with a chroma edge in which the video coder performs more, fewer, or different steps than operation 280. In other examples, the video coder may perform the steps of operation 280 in different orders or in parallel.

After the video coder starts operation 280, the video coder may determine whether a current CU video block is within a P-slice or a B-slice (282). The current CU video block is a video block associated with a CU (i.e., a current CU) that the video coder is currently coding. In response to determining that the current CU video block is within a P-slice or a B-slice ("YES" of 282), the video coder may associate a third boundary strength value (Bs) with the edge (284). In the example of FIG. 6, the third boundary strength value is equal to 0. A boundary strength value equal to zero may indicate that a deblocking filter will not be applied to the chroma edge. Thus, the video coder may apply a deblocking filter to the chroma edge only when the chroma edge is in an I-slice.

In response to determining that the current CU video block is not in a P-slice or a B-slice (i.e., the current CU video block is in an I-slice) ("NO" of 282), the video coder may determine whether the chroma edge corresponds to an internal edge of a 4N×4N TU, where N is the length in luma samples of the edge (286). For example, the video coder may determine whether the chroma edge corresponds to an internal edge of a 32×32 TU when the length of the edge is eight samples. An external edge of a TU may be an edge that corresponds to a boundary between video blocks associated with different TUs. An internal edge of a TU may be an edge that does not correspond to a boundary between video blocks associated with different TUs.

In response to determining that the chroma edge corresponds to an internal edge of a 4N×4N TU ("YES" of 286), the video coder may associate the third boundary strength value (Bs) with the chroma edge (284). However, in response to determining that the chroma edge does not correspond to an internal edge of a 4N×4N TU ("NO" of 286), the video coder may associate a first boundary strength value with the chroma edge (288). In the example of FIG. 6, the first boundary strength value is equal to two.

In steps 202 and 204 of FIG. 4, the video coder may test edges on an 8×8 luma sample grid to determine whether the edges correspond to edges of PUs or TUs of a CU. The video coder may store data indicating whether an edge corresponds to an edge of PU or TU edge in an array based on coordinates relative to the top-left luma sample of the block of residual luma samples. Each CU may be associated with a block of residual luma samples and two blocks of residual chroma samples. The video coder may sub-sample or down-sample the blocks of residual chroma samples such that each of the blocks of residual chroma samples has one half the width and height of the block of residual luma samples. For example, a TU of the CU may initially be associated with a 32×32 block of residual luma samples and two 32×32 blocks of residual chroma samples. In this example, the video coder may sub-sample or down-sample the blocks of residual chroma samples into 16×16 blocks of residual chroma samples.

Thus, in a sub-sampled or down-sampled block of residual chroma samples, internal edges of the TU that were previously eight samples apart are now four samples apart. As a result, the coordinates of an edge in the block of residual chroma samples may not be the same as they were before sub-sampling or down-sampling. Hence, the video coder would need to convert the coordinates of the edge in order to determine whether the edge corresponds to an edge of a PU or a TU. This may increase the complexity of the deblocking process. To avoid this complexity, the video coder may set the Bs value for internal edges of 4N×4N TUs to the third boundary strength value. Thus, the video coder does not apply deblocking filters to internal edges of 4N×4N TUs.

That is, the edge lookup operation may no longer be necessary for the chroma video block because the video coder may perform chroma deblocking on a fixed N×N deblocking grid and down-sampling from the luma video block to the chroma video block typically results in video blocks no larger than N×N samples. For example, the largest TU size of a luminance video block is typically 2N×2N which the video coder may down-sample to an N×N chroma video block. In this case, the video coder may determine that all edges of the fixed N×N deblocking grid are TU edges and may be deblocked. As an example, the chroma deblocking may be performed on a fixed 8×8 deblocking grid. Since the largest TU size of the luminance video block is typically 16×16 samples, the down-sampled chrominance video block may have a size of 8×8 samples, which is equivalent to the fixed 8×8 deblocking grid.

One exception may exist when the TU size of the luminance video block is larger than 2N×2N, e.g., 4N×4N. In this case, the luminance video block is down-sampled to a 2N×2N chrominance video block that includes four N×N deblocking grids on which to apply the deblocking filter. As an example, the TU size of the luma video block may be 32×32 samples such that the down-sampled chrominance video block has a size of 16×16 samples, which includes four of the fixed 8×8 deblocking grids. The deblocking filter may not be performed on any of the edges of the N×N deblocking grids that are internal to the 2N×2N chrominance video block. In this case, therefore, the video coder may perform a check to ensure that the internal edges of the 4N×4N luminance video block (and the 2N×2N chrominance video block) are not processed, i.e., the deblocking filter is turned off with the Bs value equal to zero for the internal edges.

The techniques enable the video coder to identify TU and PU edges according to an N×N grid. In addition, the video coder may determine whether a chroma video block has a size larger than N×N samples. The video coder may apply, when the chroma video block has a size smaller than or equal to N×N samples, the deblocking filter to the chroma samples associated with the edge. However, when the chroma video block has a size larger than N×N samples, the video coder may turn the deblocking filter off for edges of the grid that are internal to the chroma video block.

In some examples, step 286 is applicable where each edge is eight samples wide or high. In such examples, the edges may form an N×N sample grid. Applying a deblocking filter to chroma samples of internal edges of a 4N×4N TU may not sufficiently improve visual quality to justify the complexity and performance cost of applying the deblocking filter. Hence, by associating the third boundary strength value with a chroma edge that does not correspond to an external edge of a 32×32 TU, the video coder may only apply a deblocking filter to chroma samples associated with the edge when the edge corresponds to an external edge of a 32×32 TU and the edge is associated with the first boundary strength value. In this way, the video coder may advantageously avoid the complexity and performance costs associated with performing further deblocking operations with regard to the chroma edge.

Figure 7:
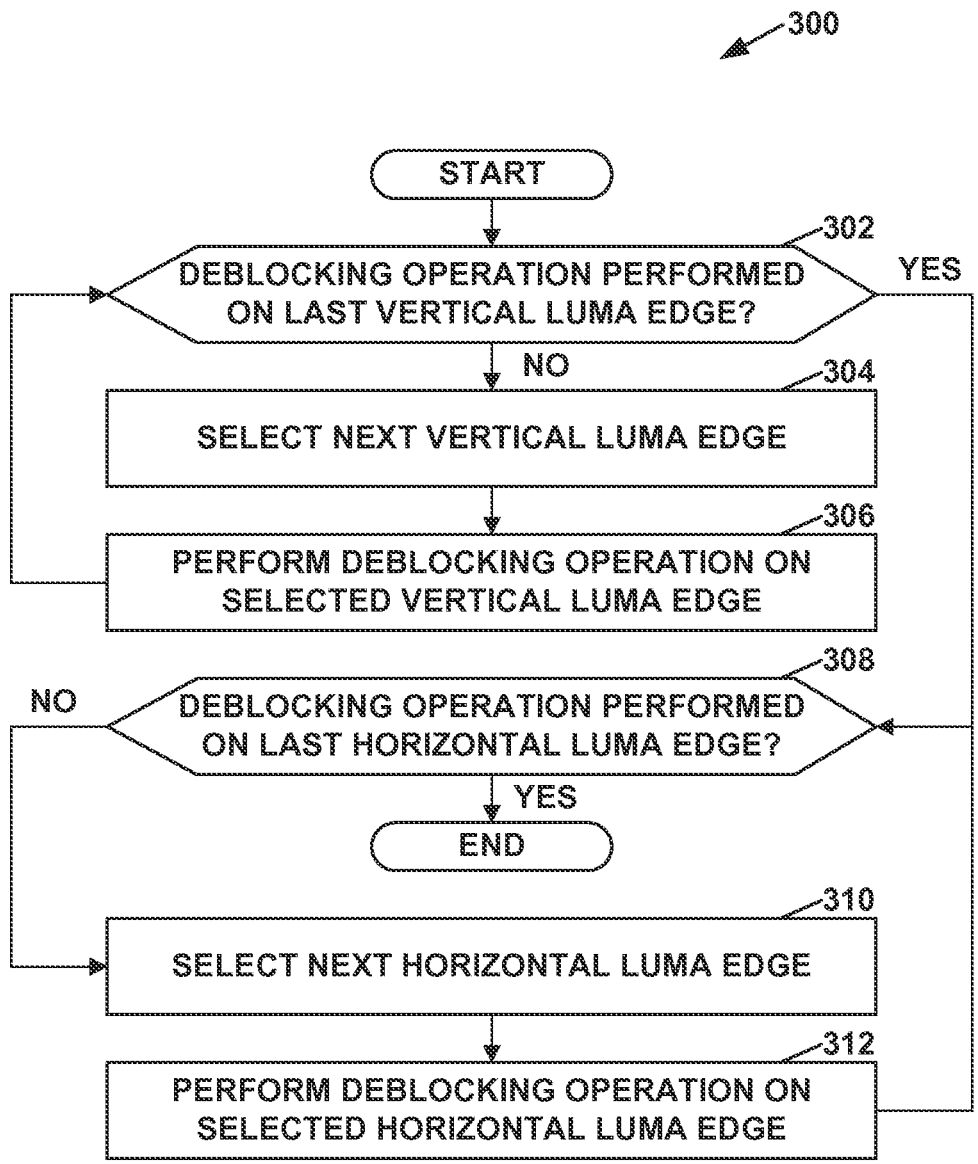
FIG. 7 is a flowchart that illustrates an example operation to deblock luma edges of a coding unit.

FIG. 7 is a flowchart that illustrates an example operation 300 to deblock luma edges of a CU. A video coder, such as video encoder 20 or video decoder 30, may perform luma edge deblocking operation 300. In other examples, the video coder may use operations other than luma edge deblocking operation 300. For instance, in other examples, the video coder may perform a luma edge deblocking operation in which the video coder performs more, fewer, or different steps than luma edge deblocking operation 300. In other examples, the video coder may perform the steps of luma edge deblocking operation 300 in different orders or in parallel.

After the video coder starts luma edge deblocking operation 300, the video coder may determine whether the video coder has performed a deblocking operation on a last vertical luma edge associated with a current CU video block (302). The current CU video block may be a video block associated with a CU that the video coder is currently coding (i.e., the current CU). The last vertical luma edge may be a final vertical luma edge when the vertical luma edges associated with the current CU video block are sequenced from left to right according to a geometric order.

In response to determining that the video coder has not yet performed a deblocking operation on the last vertical luma edge ("NO" of 302), the video coder may select a next vertical luma edge associated with the current CU video block (304). The next vertical luma edge may be the first vertical luma edge associated with the current CU video block on which a deblocking operation has not yet been performed. The video coder may then perform a deblocking operation on the selected luma vertical edge (306). By performing the deblocking operation on the selected vertical luma edge, the video coder may reduce or eliminate blocking artifacts associated with the selected vertical luma edge. The video coder may perform various deblocking operations on the selected vertical luma edge. For example, the video coder may perform the example deblocking operation of FIG. 8 on the selected vertical luma edge. In other examples, the video coder may perform deblocking operations different than the deblocking operation of FIG. 8 on the selected vertical luma edge.

After performing the deblocking operation on the selected vertical luma edge, the video coder may determine again whether a deblocking operation has been applied to a last vertical luma edge associated with the current CU video block (302). If not, the video coder may repeat steps 304 and 306 with regard to another vertical luma edge associated with the current CU video block. In this way, the video coder may perform deblocking operations on each of the vertical luma edges associated with the current CU video block.

In response to determining that a deblocking operation has been performed on a last vertical luma edge associated with the current CU video block ("YES" of 302), the video coder may determine whether a deblocking operation has been performed on a last horizontal luma edge associated with the current CU video block (308). The last horizontal luma edge may be a last horizontal luma edge when the horizontal luma edges associated with the current CU video block are sequenced from top to bottom according to a geometric order.

In response to determining that the video coder has not yet performed a deblocking operation on the last horizontal luma edge ("NO" of 308), the video coder may select a next horizontal luma edge associated with the current CU video block (310). The next horizontal luma edge may be the first horizontal luma edge associated with the current CU video block on which a deblocking operation has not yet been performed. The video coder may then perform a deblocking operation on the selected horizontal luma edge (312). By performing the deblocking operation on the selected horizontal luma edge, the video coder may reduce or eliminate blocking artifacts associated with the selected horizontal luma edge. The video coder may perform various deblocking operations on the selected horizontal luma edge. For example, the video coder may perform the example deblocking operation of FIG. 8 on the selected horizontal luma edge.

After performing the deblocking operation on the selected horizontal luma edge, the video coder may determine again whether a deblocking operation has been applied to a last horizontal luma edge associated with the current CU video block (308). If not, the video coder may repeat steps 310 and 312 with regard to another horizontal luma edge associated with the current CU video block. However, in response to determining that the video coder has performed a deblocking operation on the last horizontal luma edge associated with the current CU video block ("YES" of 308), the video coder may end luma edge deblocking operation 300. In this way, the video coder may perform deblocking operations on each of the vertical and horizontal luma edges associated with the current CU video block.

Figure 8:
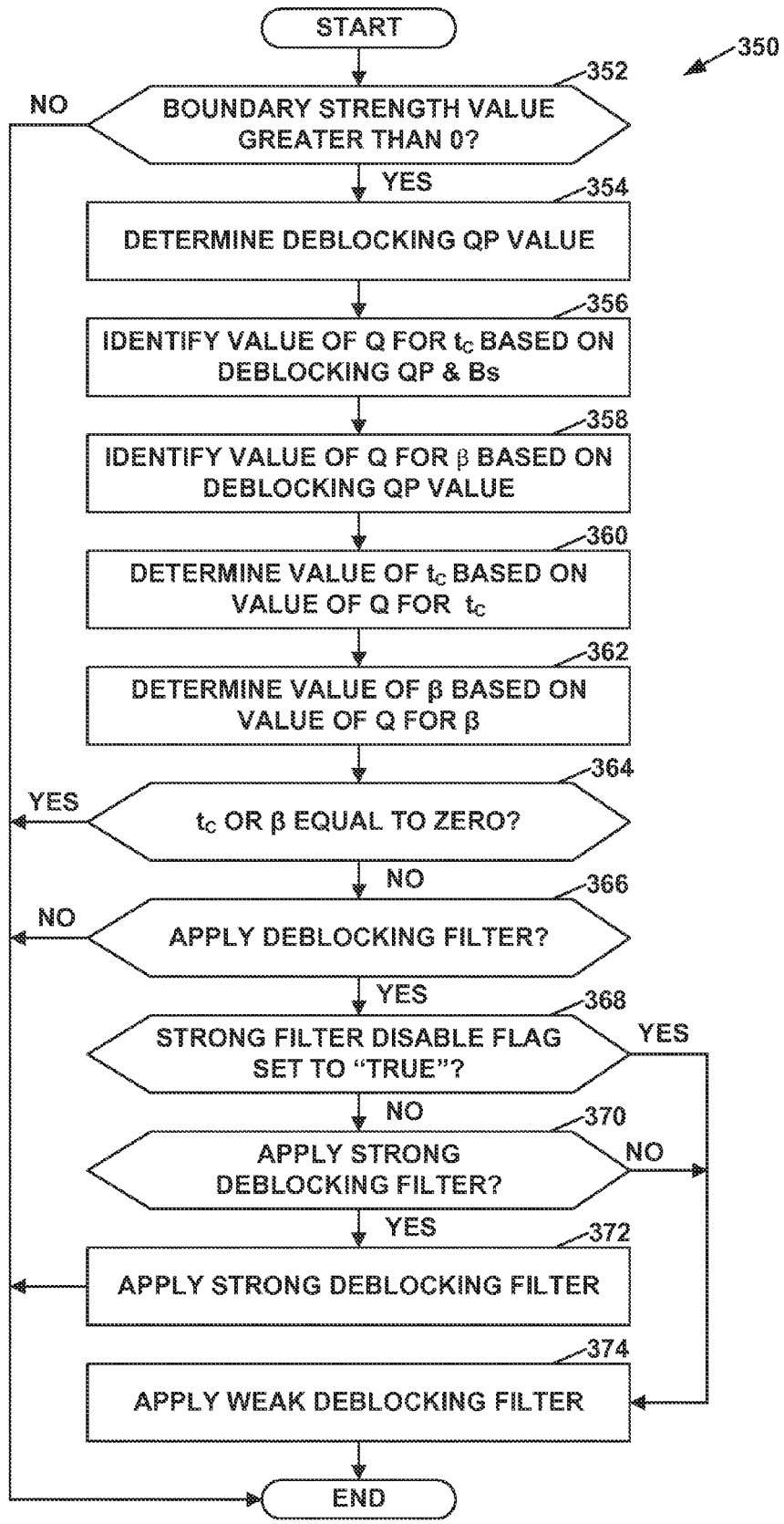
FIG. 8 is a flowchart that illustrates an example deblocking operation performed by a video coder on an individual luma edge.

FIG. 8 is a flowchart that illustrates an example deblocking operation 350 performed by a video coder on an individual luma edge. In some examples, a video coder, such as video encoder 20 or video decoder 30, may perform deblocking operation 350. The video coder may perform deblocking operation 350 with regard to a luma edge associated with a video block of a CU that the video coder is currently coding. For ease of explanation, this disclosure may refer to the CU that the video coder is currently coding as the current CU. Furthermore, this disclosure may refer to the video block associated with the current CU as the current CU video block. This disclosure may refer to the edge on which the video coder is performing deblocking operation 350 as the current edge.

After the video coder starts deblocking operation 350, the video coder may determine whether the boundary strength value associated with the current edge is greater than zero (352). In other words, the video coder may determine whether the boundary strength value associated with the current edge is equal to the first or the second boundary strength values.

In response to determining that the boundary strength value associated with the current edge is not greater than zero ("NO" of 352), the video coder may end deblocking operation 350 with respect to the current edge. Thus, the video coder does not apply a deblocking filter to the current edge when the boundary strength value associated with the current edge is equal to zero (i.e., the third boundary strength value). However, the video coder may apply one or more deblocking filters to luma samples associated with the current edge when the current edge is associated with the first boundary strength value (e.g., 2) or the second boundary strength value (e.g., 1).

On the other hand, in response to determining that the boundary strength value associated with the current edge is greater than zero ("YES" of 352), the video coder may determine a deblocking QP value (354). The video coder may determine the deblocking QP value in various ways. For example, if the current edge occurs at a boundary between the current CU video block and a video block of a neighboring CU, the video coder may determine the deblocking QP value based on a luma QP value associated with the current CU and/or a luma QP value associated with the neighboring CU. In this example, the video coder may determine the deblocking QP value based on the following formula: $qP_L = ((QP_Y + QP_P + 1) >> 1)$, where $qP_L$ is the deblocking QP value, $QP_Y$ is a luma QP value associated with the current CU, $QP_p$ is the luma QP value associated with the neighboring CU, and ">>" is the right shift operator.

After determining the deblocking QP value, the video coder may identify, based on the deblocking QP value and the boundary strength value associated with the current edge, a value of a parameter Q for a threshold $t_c$ (356). In some examples, the video coder may identify the value of the parameter Q for $t_c$ using the following pseudo-code:

If Bs>2, the TcOffset=2
If Bs≤2, then TcOffset=0
Q=Clip3(0, MAX_QP+4, QP+TcOffset), where MAX_QP=51.

In the pseudo-code above, "Bs" indicates the boundary strength value associated with the current edge and "QP" indicates the deblocking QP value. In the pseudo code above, Clip3(x, y, z)=x if z<x; y if z>y; and z otherwise.

In another example, the video coder may identify the value of the parameter Q for $t_c$ using the following pseudo-code:

If Bs=2, the TcOffset=2
If Bs=1, then TcOffset=0
If Bs=0, then deblocking filter is off
Q=Clip3(0, MAX_QP+4, QP+TcOffset), where MAX_QP=51.

In another example, the video coder may identify the value of parameter Q for $t_c$ as Q=Clip3(0, 55, $qP_L$+2*(Bs−1)+(tc_offset_div2<<1)), where $qP_L$ is the deblocking QP value, Bs is the boundary strength value associated with the current edge, and "tc_offset_div2" is a deblocking parameter offset for $t_c$.

In addition, the video coder may identify, based on the deblocking QP value, a value of the parameter Q for a threshold β (358). In some examples, the video coder may identify the value of parameter Q for β using the following formula:

$Q=Clip3(0, MAX\_QP, QP)$, where $MAX\_QP=51$.

In the pseudo-code above, "Bs," "QP," and "Clip3" may have the same meanings as in the pseudo-code above. In another example, the video coder may identify the value of parameter Q for β as Q=Clip3(0, 51, $qP_L$+(beta_offset_div2<<1)), where $qP_L$ indicates the deblocking QP and "beta_offset_div2" is a deblocking parameter offset for β.

The video coder may then determine a value of $t_c$ based on the value of Q identified for $t_c$ (360). In addition, the video coder may determine the value of β based on the value of Q identified for β (362). In some examples, the video coder may use the values of Q for $t_c$ and β as indexes to look up the values of $t_c$ and β in one or more lookup tables. For instance, the video coder may use the following table to identify values of $t_c$ and β.

To use a value of Q as an index to look up a value of $t_c$ or β in this lookup table, the video coder may locate the value of Q in the lookup table and then identify the value specified for $t_c$ or β below the value of Q.

After the video coder determines the values of $t_c$ and β, the video coder may determine whether $t_c$ or β are equal to zero (364). In response to determining that either $t_c$ or β are equal to zero ("YES" of 364), the video coder may end deblocking operation 350 with regard to the current edge. As described below, ending deblocking operation 350 when tc or β are equal to zero may reduce the complexity and increase the performance of the video coder.

In this way, the video coder may determine a first threshold value (i.e., $t_c$) and a second threshold value (i.e., β) based on a deblocking quantization parameter value and based on whether the first or the second boundary strength value is associated with the current edge. In addition, the video coder may determine whether the first or the second threshold values are equal to zero and apply no deblocking filter to the luma samples associated with the current edge when either the first or the second threshold value is equal to zero. However, the video coder may apply one or more deblocking filters to the luma samples associated with the current edge when the current edge is associated with the first or second boundary strength value and neither the first nor the second threshold value is equal to zero.

In response to determining neither $t_c$ nor β is equal to zero ("NO" of 364), the video coder may determine, based on β and luma samples associated with the current edge, whether to apply a deblocking filter to the luma samples associated with the current edge (366). In response to determining, based on β and the luma samples associated with the current edge, not to apply the deblocking filter to the luma samples associated with the current edge ("NO" of 366), the video coder may end deblocking operation 350 with regard to the current edge. Accordingly, the determination of step 366 may be an on/off decision for a deblocking filter.

The video coder may make this determination in various ways. For example, the video coder may calculate a value d as follows:

$$dp0 = |p_{2,0} - 2*p_{1,0} + p_{0,0}|$$

$$dp3 = |p_{2,3} - 2*p_{1,3} + p_{0,3}|$$

$$dq0 = |q_{2,0} - 2*q_{1,0} + q_{0,0}|$$

$$dq3 = |q_{2,3} - 2*q_{1,3} + q_{0,3}|$$

TABLE 1

Threshold values $t_c$ and β as a function of a parameter Q derived from QP.

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 1 | 2 | 2 | 2 | 2 | 3 | 3 | 3 | 3 | 4 | 4 |
| Q | 38 | 39 | 40 | 41 | 42 | 43 | 44 | 45 | 46 | 47 | 48 | 49 | 50 | 51 | 52 | 53 | 54 | 55 | |
| β | 38 | 40 | 42 | 44 | 46 | 48 | 50 | 52 | 54 | 56 | 58 | 60 | 62 | 64 | 64 | 64 | 64 | 64 | |
| $t_C$ | 5 | 5 | 6 | 6 | 7 | 8 | 9 | 9 | 10 | 10 | 11 | 11 | 12 | 12 | 13 | 13 | 14 | 14 | |

$$dpq0 = dp0 + dq0$$

$$dpq3 = dp3 + dq3$$

$$d = dpq0 + dqp3$$

In this example, the video coder may make the determination to apply the deblocking filter in response to determining that the value d is less than β. In this example, dp0, dp3, dq0, and dq3 may be measurements of sample activity.

In the formula above, $p_{2,0}$, $p_{1,0}$, $q_{0,0}$, etc., are labels for samples. The labels follow the following format: letter$_{x,y}$. The letter indicates a video block "q" or a video block "p." The x subscript indicates a horizontal displacement in samples from the top-left end of the current edge. The y subscript indicates a vertical displacement in samples from the top-left end of the current edge. If samples are denoted using a letter and only a single subscript, it may be assumed that all of the denoted samples are in a single line. FIG. 9 is a conceptual diagram that indicates example labels of samples at a vertical edge between a first video block "A" and a second video block "B." This disclosure may use this labeling format in other formulas.

In another example, the video coder may calculate the value d as follows:

$$d = |p_{2,2} - 2*p_{1,2} + p_{0,2}| + |q_{2,2} - 2*q_{1,2} + q_{0,2}| + |p_{2,5} - 2*p_{1,5} + p_{0,5}| + |q_{2,5} - 2*q_{1,5} + q_{0,5}|$$

In this example, the video coder may make the determination to apply the deblocking filter in response to determining that the value d is less than β.

In a similar example, the value d may be a Boolean value calculated using the following formulas:

$$d_1 = |p_{2,2} - 2*p_{1,2} + p_{0,2}| + |q_{2,2} - 2*q_{1,2} + q_{0,2}|$$

$$d_2 = |p_{2,5} - 2*p_{1,5} + p_{0,5}| + |q_{2,5} - 2*q_{1,5} + q_{0,5}|$$

$$d = d_1 + d_2 < \beta$$

In this example, the video coder may make the determination to apply the deblocking filter in response to determining that the value d is true and may make the determination not to apply the deblocking filter in response to determining that the value d is false. Thus, if the summed activity measurements (e.g., $|p_{2,2} - 2*p_{1,2} + p_{0,2}|$, $|q_{2,2} - 2*q_{1,2} + q_{0,2}|$, etc.) are less than the threshold value β, the video coder may apply a deblocking filter to an eight-sample deblocking edge area. In this way, if the activity across the edge is high, the deblocking filter may not be necessary because the discontinuity across the edge may not be visible. However, if the activity across the edge is low, the video coder may apply a deblocking filter to smooth discontinuities between the video blocks on either side of the edge.

In response to making the determination to apply a deblocking filter ("YES" of 366), the video coder may determine whether a strong filter disable flag is set to "true" (368). The strong filter disable flag may be signaled within various syntax structures in a bitstream. For example, the strong filter disable flag may be indicated in a sequence parameter set, an adaptation parameter set, a picture parameter set, or a slice header as part of deblocking filter control parameters.

The signaling of strong filter disable flags in the bitstream may be advantageous for several reasons. For example, the signaling of strong filter disable flags in the bitstream may reduce the complexity of video decoding because the strong/weak deblocking filter determination may be avoided and the weak deblocking filter may have less complexity than the strong deblocking filter.

In response to determining that the strong filter disable flag is not set to "true" ("NO" of 368), the video coder may determine whether to apply a strong deblocking filter to samples associated with the current edge (370). In other words, the video coder may make a strong/weak deblocking filter decision. When the texture or activity level is low, the gradient is smooth, and the discontinuity across the edge is small, then the video coder should apply a strong filter to provide more smoothing of the discontinuity between the video blocks associated with the edge. Otherwise, when the texture or activity level is high, the gradient is choppy, and the discontinuity across the edge is large, the video coder should apply a weak filter to provide less smoothing at the edge.

The video coder may make the determination whether to apply the strong deblocking filter in various ways. For example, the current edge may be eight samples wide or high. In this example, the eight luma samples may be divided equally into a first segment and a second segment. The first segment may include the first four samples (i.e., samples 0 . . . 3) and the second segment may include the last four samples (i.e., samples 4 . . . 7). In this example, the video coder may make a strong/weak determination for the first segment and another strong/weak determination for the second segment. The video coder may separately apply a strong or a weak deblocking filter in steps 372 and 374 to luma samples associated with the first segment and the second segment. The video coder may perform the example operation illustrated in FIG. 10 to determine whether to apply a strong or a weak deblocking filter to the first or second segment.

In other examples, a segment of the current edge may be four samples wide or high. In such examples, the video coder may make the strong/weak determination for the segment of the current edge based on values of samples in a first line of samples and a fourth line of samples that crosses the current edge. A line of samples may be a series of adjacent samples that are perpendicular to the current edge (and hence perpendicular to the boundary between a first video block and a second video block). For example, if the current edge is horizontal, the lines are vertical. Likewise, if the current edge is vertical, the lines are horizontal.

In yet other examples, the video coder may make separate strong/weak determinations for each line of samples that crosses the current edge. In such examples, the video coder may separately apply a strong or a weak deblocking filter in steps 372 and 374 to luma samples in each line of samples that crosses the current edge.

In response to making the determination to apply a strong deblocking filter ("YES" of 370), the video coder may apply the strong deblocking filter to luma samples associated with the current edge (372). In some examples, applying the strong deblocking filter may modify samples up to three samples away from the edge in both directions.

The video coder may apply the strong deblocking filter in various ways. For example, the video coder may apply the following strong deblocking filter to a line of luma samples that crosses the current luma edge:

$$p_0' = (p_2 + 2*p_1 + 2*p_0 + 2*q_0 + q_1 + 4)/8$$

$$p_1' = (p_2 + p_1 + p_0 + q_0 + 2)/4$$

$$p_2' = (2*p_3 + 3*p_2 + p_1 + p_0 + q_0 + 4)/8$$

$$q_0' = (p_1 + 2*p_0 + 2*q_0 + 2*q_1 + q_2 + 4)/8$$

$q_1'=(p_0+q_0+q_1+q_2+2)/4$ $q_2'=(p_0+q_0+q_1+3*q_2+2*q_3+4)/8$

In the lines above, "q" may denote a first video block and "p" may denote a second, neighboring video block. $p_0, p_1, p_2, p_3$ denote original values of samples of the second video block that are respectively zero, one, two, and three samples away from a boundary between the first video block and the second video block. $p_0', p_1',$ and $p_2'$ denote modified values of samples of the second video block that are respectively zero, one, and two samples away from a boundary between the first video block and the second video block. $q_0, q_1, q_2,$ and $q_3$ denote original values of samples of the first video block that are respectively zero, one, two, and three samples away from the boundary between the first video block and the second video block. $q_0', q_1',$ and $q_2'$ denote modified values of samples of the first video block that are respectively zero, one, and two samples away from a boundary between the first video block and the second video block.

In another example, the video coder may apply the following strong deblocking filter to a line of luma samples that crosses the current edge:

$\Delta=(9*(q_0-p_0)-3*(q_1-p_1)+8)/16$ $\Delta=\text{Clip}(-t_c,t_c,\Delta)$ $p_0'=p_0+\Delta$ $q_0'=q_0-\Delta$ $\Delta p=\text{Clip}(-t_c/2,t_c/2,((p_2+p_1+1)/2-p_1+\Delta)/2)$ $p_1'=p_1+\Delta P$ $\Delta q=\text{Clip}(-t_c/2,t_c/2,((q_2+q_0+1)/2-q_1-\Delta)/2)$ $q_1'=q_1+\Delta q$ This strong deblocking filter may possess one or more advantages over the strong deblocking filter of the previous paragraph. For example, this strong deblocking filter may preserve the deblocking strength of the strong deblocking filter of the previous paragraph, but a line memory buffer requirement of the video coder may be three lines instead of the four lines required in the strong deblocking filter of the previous paragraph.

In another example, the video coder may apply the following strong deblocking filter to luma values in a line of samples:

$p_0'=\text{Clip3}(p_0-2*t_c,p_0+2*t_c,(p_2+2*p_1+2*p_0+2*q+q_1+4)\\>>3)$ $p_1'=\text{Clip3}(p_1-2*t_c,p_1+2*t_c,(p_2+p_1+p_0+q_0+2)>>2)$ $p_2'=\text{Clip3}(p_2-2*t_c,p_2+2*t_c,(2*p_3+3*p_2+p_1+p_0+q_0+4)\\<<3))$ $q_0'=\text{Clip3}(q_0-2*t_c,q_0+2*t_c,(p_1+2*p_0+2*q_0+2*q_1+q_2+\\4)>>3))$ $q_1'=\text{Clip3}(q_1-2*t_c,q_1+2*t_c,(p_0+q_0+q_1+q_2+2)>>2)$ $q_2'=\text{Clip3}(q_2-2*t_c,q_2+2*t_c,(p_0+q_0+q_1+3*q_2+2*q_3+4)\\<<3)$ In response to making the determination that the strong filter disable flag is set to "true" ("YES" of 368) or in response to making the determination to apply a weak deblocking filter to the selected segment ("NO" of 370), the video coder may apply a weak deblocking filter to luma samples associated with the current edge (374). Thus, if the strong filter disable flag is set to "true," the video coder only uses the weak deblocking filter and the video coder does not perform the determination whether to perform the strong/weak deblocking filter.

The video coder may apply the weak deblocking filter in various ways. For example, the video coder may apply the following weak deblocking filter to a line of luma samples:

$\Delta=(9*(q_0-p_0)-3*(q_1-p_1)+8)/16$ $\Delta=\text{Clip3}(-t_c,t_c,\Delta)$ $p_0'=p_0+\Delta$ $q_0'=q_0-\Delta$ $\Delta p=\text{Clip3}(-t_c/2,t_c/2,((p_2+p_0+1)/2-p_1+\Delta)/2)$ $p_1'=p_1+\Delta p$ $\Delta q=\text{Clip3}(-t_c/2,t_c/2,((q_2+q_0+1)/2-q_1-\Delta)/2)$ $q_1'=q_1+\Delta q$ In the lines above, $p_0, p_1, p_2, p_0', p_1', q_0, q_1, q_2, q_0', q_1',$ and the "Clip3" function may have the same meanings as those provided above. This weak deblocking filter is described in greater detail below with regard to FIGS. 13B and 14B.

In another example, the video coder may apply the following weak deblocking filter to a line of luma samples that crosses the current luma edge:

$\Delta=(3*(q0-p0)-(q1-p1)+4)/8$ $\Delta=\text{Clip3}(-t_c,t_c,\Delta)$ $p0'=p0+\Delta$ $q0'=q0-\Delta$ $\Delta p=\text{Clip3}(-t_c/2,t_c/2,((p2+p0+1)/2-p1+\Delta)/2)$ $p1'=p1+\Delta p$ $\Delta q=\text{Clip3}(-t_c/2,t_c/2,((q2+q0+1)/2-q1-\Delta)/2)$ $q1'=q1+\Delta q$ In the lines above, $p_0, p_1, p_2, p_0', p_1', q_0, q_1, q_2, q_0', q_1',$ and the "Clip3" function may have the same meanings as those provided above. This weak deblocking filter is described in greater detail below with regard to FIG. 14C.

In another example, the video coder may apply the following weak deblocking filter to a line of luma samples that crosses the current edge:

$\Delta=(3*(q_0-p_0)-3*(q_1-p_1)+8)/16$ $\Delta=\text{Clip3}(-t_c,t_c,\Delta)$ $p_0'=p_0+\Delta$ $q_0'=q_0-\Delta$ $\Delta p=\text{Clip3}(-t_c/2,t_c/2,((p_2+p_0+1)/2-p_1+\Delta)/2)$ $p_1'=p_1+\Delta p$ $\Delta q=\text{Clip3}(-t_c/2,t_c/2,((q_2+q_0+1)/2-q1-\Delta)/2)$ $q_1'=q_1+\Delta q$ In the lines above, $p_0$, $p_1$, $p_2$, $p_0'$, $p_1'$, $q_0$, $q_1$, $q_2$, $q_0'$, $q_1'$, and the "Clip3" function may have the same meanings as those provided above.

Figure 10:
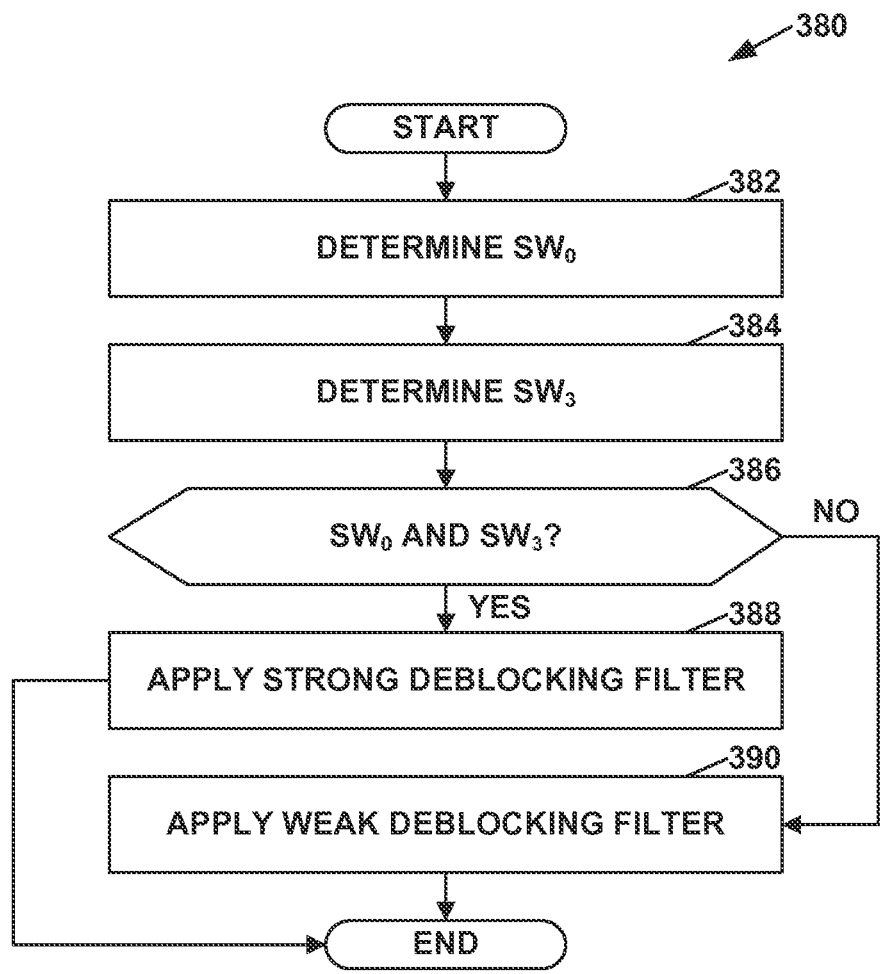
FIG. 10 is a flowchart that illustrates an example operation to determine whether to apply a strong or a weak deblocking filter to a segment of a luma edge.

FIG. 10 is a flowchart that illustrates an example operation 380 to determine whether to apply a strong or a weak deblocking filter to a segment of a luma edge. A video coder, such as video encoder 20 or video decoder 30 may perform operation 380. In other examples, the video coder may use operations other than operation 380 to determine whether to apply a strong or a weak deblocking filter to the segment. For instance, in other examples, the video coder may perform an operation to determine a boundary strength value in which the video coder performs more, fewer, or different steps than operation 380. In other examples, the video coder may perform the steps of operation 380 in different orders or in parallel.

After starting operation 380, the video coder may determine a strength indicator $sw_0$ for a first line of samples in the segment (382). In addition, the video coder may determine a strength indicator $sw_3$ for a fourth line of samples in the segment (384). In some examples, the video coder may use the following formula to determine the strength indicator for a line of samples i.

$$sw_i = 2(|p_{2,i} - 2 \cdot p_{1,i} + p_{0,i}| + |q_{0,i} - 2 \cdot q_{1,i} + q_{2,i}|) < (\beta/4) \text{ and}$$

$$(|p_{2,i} - p_{0,i}| + |q_{0,i} - q_{2,i}|) < (\beta/8) \text{ and}$$

$$|p_{0,i} - q_{0,i}| < ((5 \cdot t_c + 1)/2)$$

In this example, $2(|p_{2,i}-2 \cdot p_{1,i}+p_{0,i}|+|q_{0,i}-2 \cdot q_{1,i}+q_{2,i}|) < (\beta/4)$ may be a texture/activity determination, $(|p_{2,i}-p_{0,1}|+|q_{0,i}-q_{2,i}|) < ((\beta/8)$ may be a gradient determination, and $|q_{0,i}-q_{0,i}| < ((5 \cdot t_c+1)/2)$ may be an edge discontinuity check.

After determining the strength indicator for the first line of samples and the strength indicator for the fourth line of samples, the video coder may determine whether the strength indicator for the first line of samples ($sw_0$) and the strength indicator for the fourth line of samples ($sw_3$) are both equal to "true" (386). In response to determining that both the strength indicator for the first line of samples and the strength indicator for the fourth line of samples are equal to "true" ("YES" of 386), the video coder may make the determination to apply a strong deblocking filter to the segment of the current edge (388). Otherwise, in response to determining that either the strength indicator for the first line of samples or the strength indicator for the fourth line of samples is equal to "false" ("NO" of 386), the video coder may make the determination to apply a weak deblocking filter to the segment of the current edge (390).

In instances where the luma edge has multiple four-sample segments, the video coder may perform operation 380 on each of the segments. For example, the video coder may perform operation 380 on a second segment of the luma edge. In this example, the video coder may determine and use the strength indicators for the fifth and eighth lines of samples instead of the first and fourth lines of samples as described above.

By making the determination whether to apply a strong or a weak deblocking filter in this way, the video coder may read three samples on either side of an edge. In contrast, Test Model 5 (HM5) of HEVC may use the following formula to make the determination whether to apply a strong or weak deblocking filter:

$$sw_i = 2(|p_{2,i} - 2 \cdot p_{1,i} + p_{0,i}| + |q_{0,i} - 2 \cdot q_{1,i} + q_{2,i}|) < (\beta/4) \text{ and}$$

$$(|p_{3,i} - p_{0,i}| + |q_{0,i} - q_{3,i}|) < (\beta/8) \text{ and}$$

$$|p_{0,i} - q_{0,i}| < ((5 \cdot t_c + 1)/2)$$

In the second line of this formula, the video coder uses samples that are four samples away from the edge (i.e., $p_{3,i}$, $q_{3,i}$). Consequently, when video coder performs operation 380, the video coder may store the three rows or columns of samples on either side of the edge in a memory buffer. In contrast, if the video coder were to make the determination whether to apply a strong or a weak deblocking filter based on four or more rows or columns of samples on either side of the edge, the video coder may need to store four or more rows or columns in the memory buffer. Thus, by making the determination whether to apply a strong or a weak deblocking filter based on three samples on either side of the edge, the video coder may reduce a line memory buffer requirement while preserving a deblocking strength for the strong deblocking filter.

In another example, the video coder may use the following formula in steps 382 and 384 instead of the formulas provided above:

$$sw_i = d < (\beta >> 2) \text{ and}$$

$$(|p_{3,i} - p_{0,i}| + |q_{0,i} - q_{3,i}|) < (\beta >> 3) \text{ and}$$

$$|p_{0,i} - q_{0,i}| < ((5 \cdot t_c + 1) >> 1)$$

In the formula above, d may be calculated in the manner described above with regard to step 366 of FIG. 8. Furthermore, in the formula above, $d < (\beta >> 2)$ may be a texture/activity determination. In this example, the edge may be eight samples wide or high and video coder may make a strong/weak determination for a first segment (i.e., i=0.3) and a separate strong/weak determination for a second segment (i.e., i=4.7). The video coder may separately apply a strong or a weak deblocking filter to the first segment and the second segment. In this example, the video coder may make the strong/weak determination for the first segment by determining the value of $sw_2$ using the formula above. The video coder may make the strong/weak determination for the second segment by determining that value of $sw_5$ using the formula above. Making the strong/weak determination for the first and the second segment may be less complex than making separate strong/weak determinations for each line of samples that crosses the luma edge (i.e., i=0.7). For instance, this technique may reduce a number of computations to decide whether to apply a strong or a weak deblocking filter from twenty-four computations to six computations.

Thus, in this example, the video coder may determine, based on a third line of samples, i=2, that crosses the edge, whether to apply a first strong deblocking filter or a first weak deblocking filter to luma samples associated with a first edge segment. In addition, the video coder may determine, based on a sixth line of samples, i=5, that crosses the edge, whether to apply a second strong deblocking filter or a second weak deblocking filter to luma samples associated with the second edge segment. The first and second strong deblocking filters may be the same or different. Likewise, the first and second weak deblocking filters may be the same or different.

As discussed above, the video coder may determine in step 364 of FIG. 8, whether β and $t_c$ are equal to zero. If β is equal to zero and $t_c$ equals zero, the video coder makes the determination to apply the weak deblocking filter. For instance, $2(|p2_i-2 \cdot p1_i+p0_i|+|q0_i-2 \cdot q1_i+q2_i|)<((\beta/4))$, $(|p3_i-p0_i|+|q0_i-q3_i|)<((\beta/8))$, and $|p0_i-q0_i|<((5 \cdot t_c+1)/2)$ from the formula above evaluate to false when $\beta$ or $t_c$ are equal to zero. However, if $\beta$ is greater than zero and $t_c$ is equal to zero, the video coder may determine that a natural edge condition of the weak deblocking filter is false and the video coder does not apply the weak deblocking filter. For instance, the weak luma filter may include the line $\Delta = \text{Clip3}(-t_c, t_c, \Delta)$. If $t_c$ is equal to zero, $\Delta$ evaluates to zero. Consequently, the lines $p0'=p0+\Delta$ and $q0'=q0-\Delta$ of the weak luma filter do not change the values of the p0 and q0. Likewise, the weak deblocking filter does not change the values of p1 or q1 when $t_c$ is equal to zero. Moreover, if an edge is a chroma edge and $t_c$ is equal to zero, the video coder does not need to apply the deblocking filter to the edge because the video coder clips $\Delta$ to zero. In this way, by determining whether $\beta$ and $t_c$ are equal to zero before making the determination whether to apply a strong or a weak deblocking filter, the amount of computation that the video coder performs may be reduced. In contrast, conventional video coders may check on/off decisions for deblocking filters and perform strong/weak deblocking filter determinations for edges even when $\beta$ and $t_c$ are equal to zero.

Figure 11:
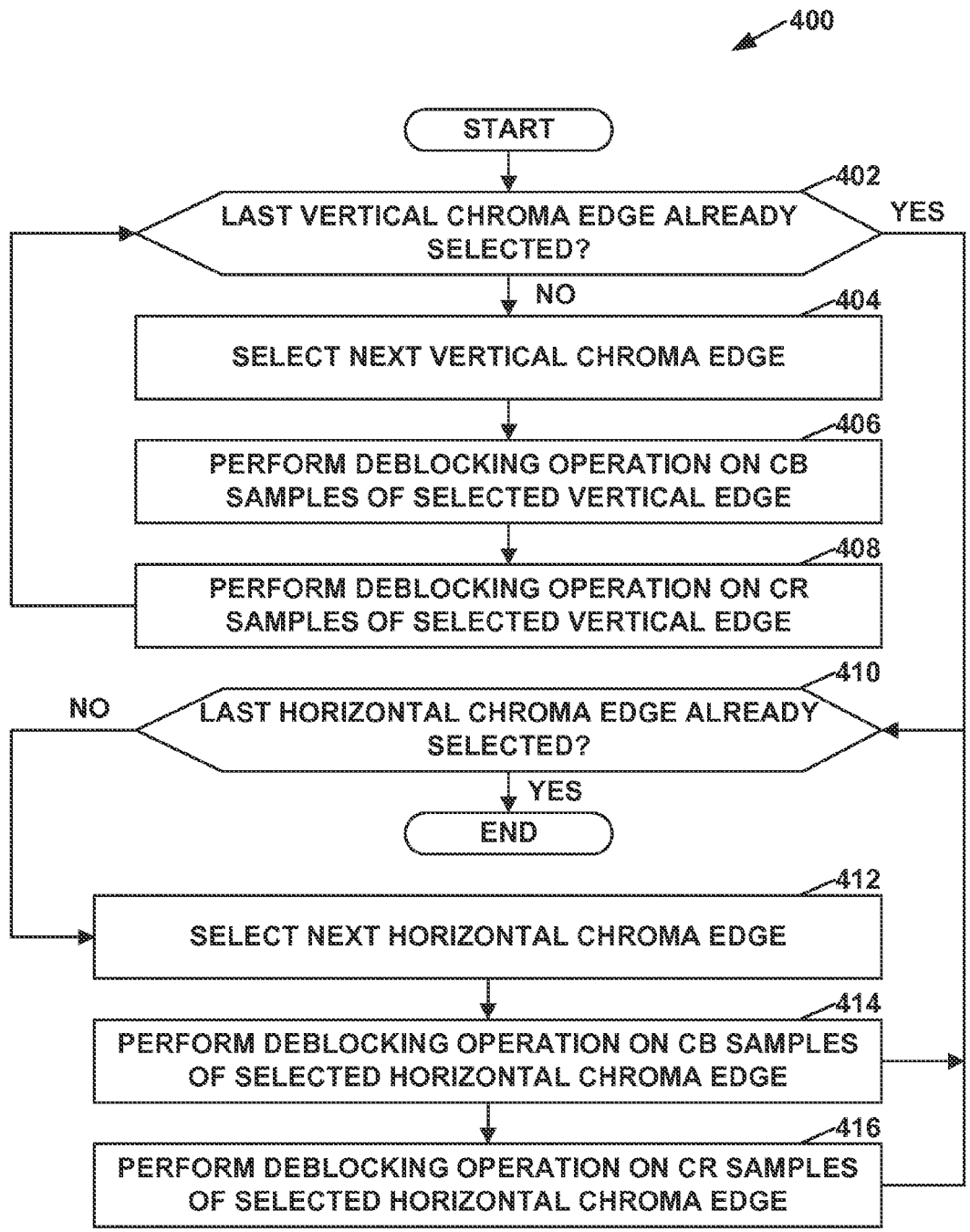
FIG. 11 is a flowchart that illustrates an example operation to deblock chroma edges of a coding unit.

FIG. 11 is a flowchart that illustrates an example operation 400 to deblock chroma edges of a CU. A video coder, such as video encoder 20 or video decoder 30, may perform chroma edge deblocking operation 400. In other examples, the video coder may use operations other than chroma edge deblocking operation 400. For instance, in other examples, the video coder may perform a chroma edge deblocking operation in which the video coder performs more, fewer, or different steps than chroma edge deblocking operation 400. In other examples, the video coder may perform the steps of chroma edge deblocking operation 400 in different orders or in parallel.

After the video coder starts chroma edge deblocking operation 400, the video coder may determine whether the video coder has already selected a last vertical chroma edge associated with a current CU video block (402). The current CU video block may be a video block associated with a CU that the video coder is currently coding (i.e., the current CU). The last vertical chroma edge may be a final vertical chroma edge when the vertical chroma edges associated with the current CU video block are sequenced from left to right according to a geometric order.

In response to determining that the video coder has not yet selected the last vertical chroma edge ("NO" of 402), the video coder may select a next vertical chroma edge associated with the current CU video block (404). The next vertical chroma edge may be the first vertical chroma edge associated with the current CU video block that the video coder has not yet selected.

The video coder may then perform a deblocking operation on Cb samples associated with the selected vertical chroma edge (406). In addition, the video coder may perform a deblocking operation on Cr samples associated with the selected vertical chroma edge (408). By performing the deblocking operations on the Cb and Cr samples of the selected vertical chroma edge, the video coder may reduce or eliminate blocking artifacts associated with the selected vertical chroma edge. The video coder may perform various deblocking operations on the Cb and Cr samples associated with the selected vertical chroma edge. For example, the video coder may perform the example deblocking operation of FIG. 12 on the Cb and Cr samples of the selected vertical chroma edge. In other examples, the video coder may perform deblocking operations different than the deblocking operation of FIG. 12 on the Cb and Cr samples of the selected vertical chroma edge.

After performing the deblocking operations on the Cb and Cr samples associated with the selected vertical chroma edge, the video coder may determine again whether a deblocking operation has been applied to a last vertical chroma edge associated with the current CU video block (402). If not, the video coder may repeat steps 404-408 with regard to another vertical chroma edge associated with the current CU video block. In this way, the video coder may perform deblocking operations on the Cb and Cr samples associated with each of the vertical chroma edges associated with the current CU video block.

In response to determining that a deblocking operation has been performed on Cb and Cr samples of a last vertical chroma edge associated with the current CU video block ("YES" of 402), the video coder may determine whether a last horizontal chroma edge associated with the current CU video block has already been selected (410). The last horizontal chroma edge may be a last horizontal chroma edge when the horizontal chroma edges associated with the current CU video block are sequenced from top to bottom according to a geometric order.

In response to determining that the video coder has not yet performed a deblocking operation on the last horizontal chroma edge ("NO" of 410), the video coder may select a next horizontal chroma edge associated with the current CU video block (412). The next horizontal chroma edge may be the first horizontal chroma edge associated with the current CU video block on which a deblocking operation has not yet been performed. The video coder may then perform a deblocking operation on the Cb samples associated with the selected horizontal chroma edge (414). In addition, the video coder may perform a deblocking operation on the Cr samples associated with the selected horizontal chroma edge (416). By performing the deblocking operation on the Cb and Cr samples associated with the selected horizontal luma edge, the video coder may reduce or eliminate blocking artifacts associated with the selected horizontal chroma edge. The video coder may perform various deblocking operations on the selected horizontal chroma edge. For example, the video coder may perform the example deblocking operation of FIG. 12 on the selected horizontal chroma edge.

After performing the deblocking operation on the Cb and Cr samples associated with the selected horizontal chroma edge, the video coder may determine again whether a last horizontal chroma edge has already been selected (410). If not, the video coder may repeat steps 412-416 with regard to another horizontal chroma edge associated with the current CU video block. However, in response to determining that the video coder has already selected the last horizontal chroma edge associated with the current CU video block ("YES" of 410), the video coder may end chroma edge deblocking operation 400. In this way, the video coder may perform deblocking operations on each of the vertical and horizontal chroma edges associated with the current CU video block.

Figure 12:
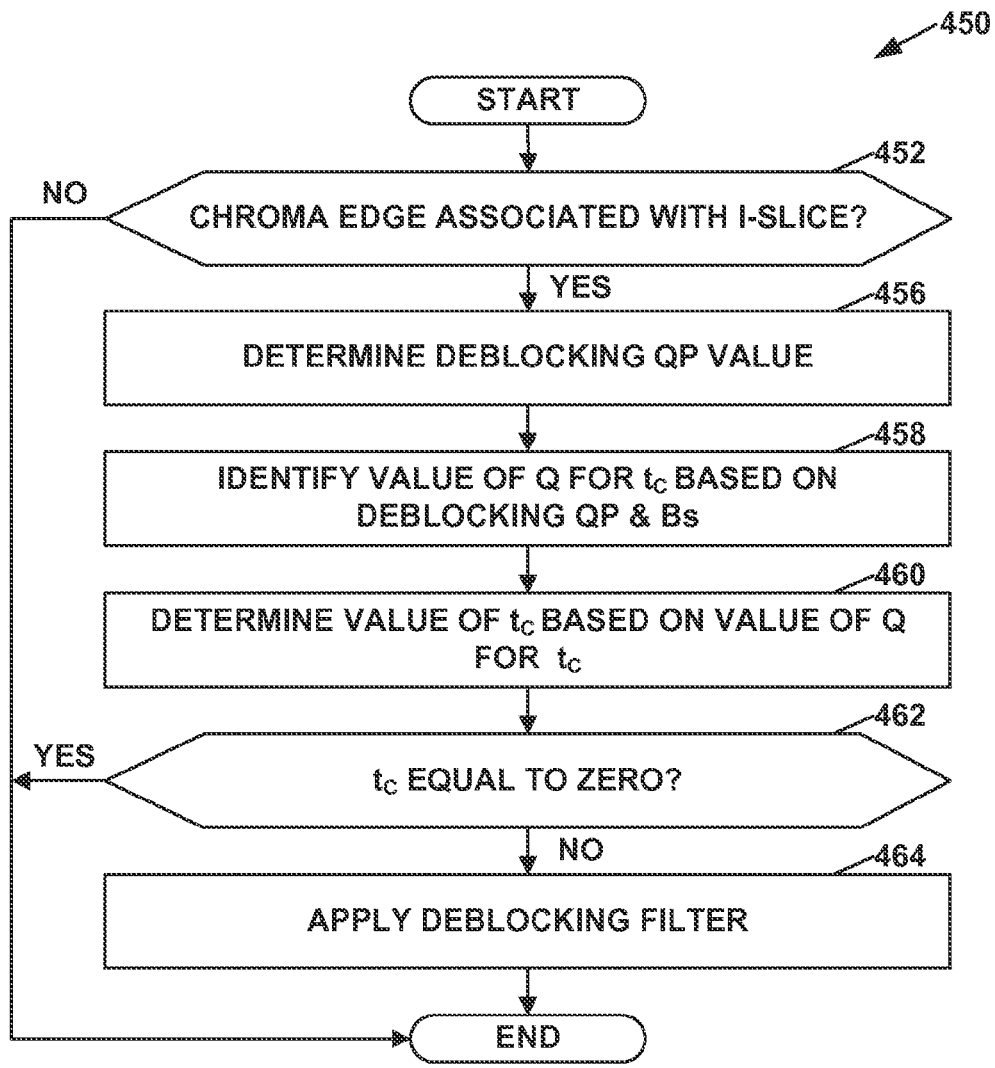
FIG. 12 is a flowchart that illustrates an example deblocking operation performed by a video coder on Cb or Cr samples associated with an individual chroma edge.

FIG. 12 is a flowchart that illustrates an example deblocking operation 450 performed by a video coder on Cb or Cr samples associated with an individual chroma edge. A video coder, such as video encoder 20 or video decoder 30, may perform deblocking operation 450. In other examples, the video coder may use operations other than deblocking operation 450. For instance, in other examples, the video coder may perform a deblocking operation in which the video coder performs more, fewer, or different steps than deblocking operation 450. In other examples, the video coder may perform the steps of deblocking operation 450 in different orders or in parallel.

After starting deblocking operation 450, the video coder may determine whether the chroma edge is associated with an I-slice (452). The chroma edge may be associated with an I-slice if the chroma edge is associated with a CU that is in an I-slice. In response to determining that the chroma edge is not associated with an I-slice ("NO" of 452), the video coder may end operation 450 with regard to the chroma edge.

In some examples, the video coder stores boundary strength values in an array that has an entry for each luma sample of the video block associated with the current CU. The entry associated with a topmost (for vertical edges) or a leftmost (for horizontal edges) luma sample may store the boundary strength value associated with an edge. The video coder may down-sample chrominance video blocks. For example, the largest TU size of a luminance video block is typically 2N×2N which the video coder may down-sample to an N×N chrominance video block. Because the video coder may down-sample chroma values in P-slices and B-slices, the number of chroma samples associated with the current CU may be smaller than the number of luma samples associated with the CU. Hence, to look up the boundary strength value associated with a chroma edge, the video coder may need to calculate the position of the luma sample that corresponds to the topmost or leftmost chroma sample of the chroma edge. The video coder may then use the position of the corresponding luma sample to look up the boundary strength value associated with the chroma edge.

Determining the position of the corresponding luma sample may add complexity to the video coder and reduce performance of the video coder. However, the video coder may not down-sample chroma samples in I-slices. Hence, the video coder may not need to calculate the position of a corresponding luma sample if the chroma edge is associated with an I-slice. Thus, by checking whether the chroma edge is associated with an I-slice and ending deblocking operation 450 if the chroma edge is not associated with an I-slice, the video coder may avoid the complexity and performance costs of calculating the position of the corresponding luma sample when the chroma edge is not associated with an I-slice.

In response to determining that the chroma edge is associated with an I-slice ("YES" of 452), the video coder may determine a deblocking QP value (456). The video coder may determine the deblocking QP value in a manner similar to that described above with regard to FIG. 8.

After determining the deblocking QP value, the video coder may identify, based on the deblocking QP value and the boundary strength value associated with the chroma edge, a value of Q for a $t_c$ threshold (458). The video coder may then determine a value of $t_c$ based on the value of Q for $t_c$ (460). The video coder may identify the value of Q for $t_c$ and the value of $t_c$ in a manner similar to that described above with regard to FIG. 8.

After determining the value of $t_c$, the video coder may determine whether $t_c$ is equal to zero (462). In response to determining that $t_c$ is equal to zero ("YES" of 462), the video coder may end deblocking operation 450 with regard to the chroma edge. Otherwise, in response to determining that $t_c$ is not equal to zero ("NO" of 462), the video coder may apply a deblocking filter to samples associated with the chroma edge (464). If the video coder is performing deblocking operation 450 with regard to Cb samples associated with the chroma edge, the video coder may apply the deblocking filter to the Cb samples associated with the chroma edge. If the video coder is performing deblocking operation 450 with regard to Cr samples associated with the chroma edge, the video coder may apply the deblocking filter to the Cr samples associated with the chroma edge. After applying the deblocking filter, the video coder may end deblocking filter 450 with regard to the chroma edge.

The video coder may apply the deblocking filter in various ways. For example, the video coder may apply the following deblocking filter to chroma samples:

$\Delta = \text{Clip3}(-t_c, t_c, ((((q0+p0)<<2)+p1-q1+4)>>3))$ $p0' = \text{Clip1}_C(p0+\Delta)$ $q0' = \text{Clip1}_C(q0-\Delta)$ The "$\text{Clip1}_C$" function above clips a value to the bit depth of chroma samples.

In another example, the video coder may apply the following deblocking filter to the chroma samples associated with the chroma edge:

$\Delta = (4*(q0-p0)-(q1-p1)+4)/8$ $\Delta = \text{Clip3}(-t_c, t_c, \Delta)$ $p0' = \text{Clip1}_C(p0+\Delta)$ $q0' = \text{Clip1}_C(q0-\Delta)$ In another example, the video coder may apply the following deblocking filter to the chroma samples associated with the chroma edge:

$\Delta = (3*(q0-p0)-(q1-p1)+4)/8$ $\Delta = \text{Clip3}(t_c, t_c, \Delta)$ $p0' = \text{Clip1}_C(p0+\Delta)$ $q0' = \text{Clip1}_C(q0-\Delta)$ This deblocking filter may possess one or more advantages over the deblocking filter of the previous paragraph. For example, in contrast to the example deblocking filter of the previous paragraph, this deblocking filter does not overshoot the linear slope. In addition, use of this deblocking filter may facilitate reuse of hardware for the luma and deblocking filters. The chroma deblocking filters are described in more detail with respect to FIGS. 13C and 13D.

FIGS. 13A-13D are conceptual diagrams that illustrate example sample value graphs. In FIGS. 13A-13D, the solid black circles represent original values of samples on opposite sides of an edge 500. A linear slope 502 indicates a straight line from a first sample to a last sample used by a weak deblocking filter.

Figure 13A:
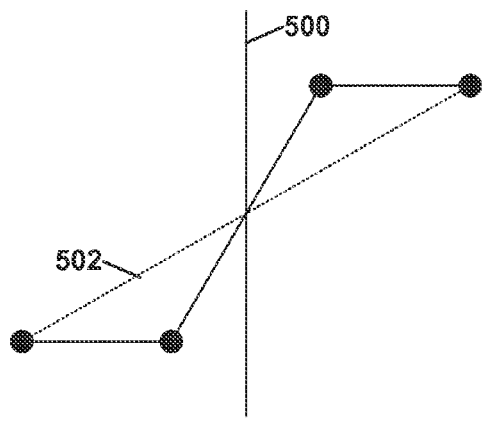
FIGS. 13A-13D are conceptual diagrams that illustrate example sample value graphs.
Figure 13B:
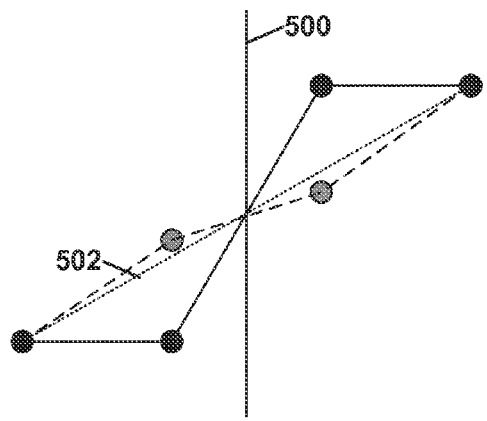

In FIG. 13B, the gray circles represent values of the luma samples after the video coder applies the following weak deblocking filter to luma samples.

$\Delta = (9*(q_0-p_0)-3*(q_1-p_1)+8)/16$ $\Delta = \text{Clip3}(-t_c, t_c, \Delta)$ $p_0' = p_0 + \Delta$ $q_0' = q_0 - \Delta$ $\Delta p = \text{Clip3}(-t_c/2, t_c/2, ((p_2+p_0+1)/2-p_1+\Delta)/2)$ $p_1' = p_1 + \Delta p$ $\Delta q = \text{Clip}(-t_c/2, t_c/2, ((q_2+q_0+1)/2-q_1-\Delta)/2)$ $q_1' = q_1 + \Delta q$ As illustrated in FIG. 13B, the weak deblocking filter of FIG. 13B may adjust the luma samples in a way that overshoots the linear slope 502. Overshooting the linear slope may mean that the value of Δ is too large, thereby potentially creating a new visual artifact that negatively affects image quality.

Figure 13C:
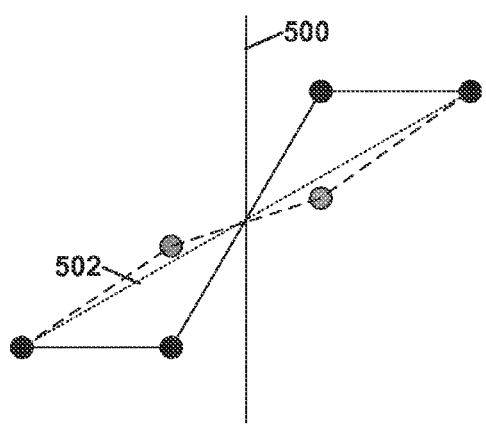

In FIG. 13C, the gray circles represent values of the samples after the video coder applies a weak deblocking filter to chroma samples.

$$\Delta=(4*(q_0-p_0)-(q_1-p_1)+4)/8$$

$$\Delta=\text{Clip3}(-t_c,t_c,\Delta)$$

$$p_0'=p_0+\Delta$$

$$q_0'=q_0-\Delta$$

$$\Delta p=\text{Clip3}(-t_c/2,t_c/2,((p_2+p_0+1)/2-p_1+\Delta)/2)$$

$$p_1'=p_1+\Delta p$$

$$\Delta q=\text{Clip}(-t_c/2,t_c/2,((q_2+q_0+1)/2-q_1-\Delta)/2)$$

$$q_1'=q_1+\Delta q$$

As illustrated in FIG. 13C, the weak deblocking filter of FIG. 13C may adjust the chroma samples in a way that overshoots the linear slope 502.

Figure 13D:
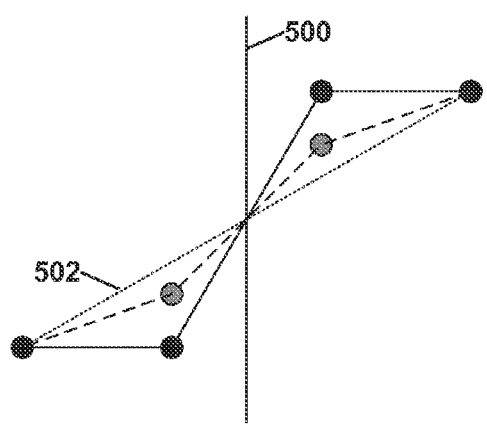

In FIG. 13D, the gray circles represent values of the chroma samples after the video coder applies a different weak deblocking filter to chroma samples.

$$\Delta=(3*(q0-p0)-(q1-p1)+4)/8$$

$$\Delta=\text{Clip3}(-t_c,t_c,\Delta)$$

$$p_0'=p_0+\Delta$$

$$q_0'=q_0-\Delta$$

$$\Delta p=\text{Clip3}(-t_c/2,t_c/2,((p_2+p_0+1)/2-p_1+\Delta)/2)$$

$$p_1'=p_1+\Delta p$$

$$\Delta q=\text{Clip}(-t_c/2,t_c/2,((q_2+q_0+1)/2-q_1-\Delta)/2)$$

$$q_1'=q_1+\Delta q$$

The weak deblocking filter of FIG. 13D does not adjust the chroma samples in a way that overshoots the linear slope 502.

Figure 14A:
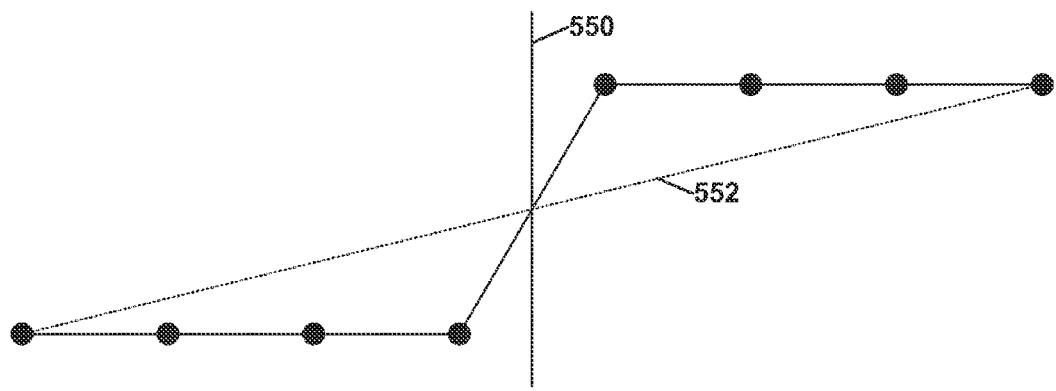
FIGS. 14A-C are conceptual diagrams that illustrate example sample value graphs.
Figure 14B:
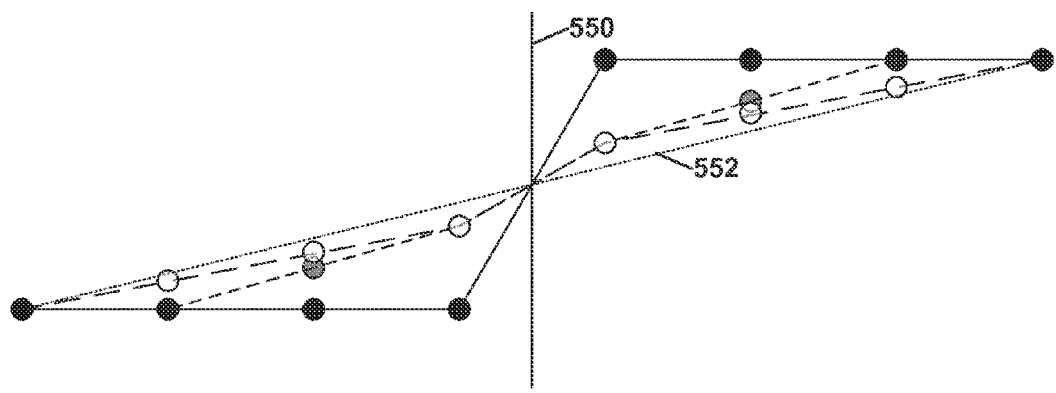
Figure 14C:
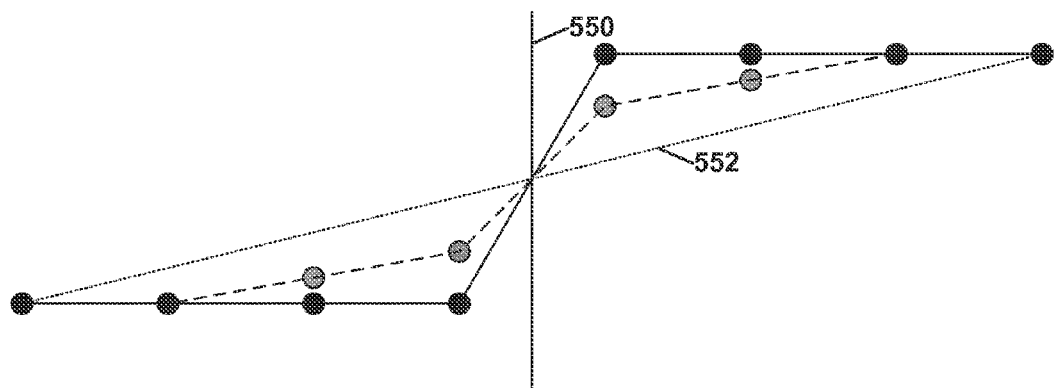

FIGS. 14A-C are conceptual diagrams that illustrate example sample value graphs. In FIGS. 14A-C, solid black circles represent original values of luma samples. Vertical lines 550 indicate edges that occur at boundaries between neighboring video blocks. Because there are step profiles or edge discontinuities in the values of luma samples on different sides of lines 550, there may be blocking artifacts associated with the edges.

FIG. 14A illustrates the original values of the samples prior to application of a deblocking filter. A finely dashed line 552 indicates a linear slope from a first sample to a last sample. The original values of the samples on either side of lines 550 are smooth and flat. Accordingly, a third part of the strong/weak decision, the edge discontinuity check, may determine whether to apply a strong or a weak deblocking filter.

In FIG. 14B, the gray circles correspond to sample values after the video coder has applied a conventional weak deblocking filter to the original luma samples. The weak deblocking filter may be expressed as:

$$\Delta=(9*(q_0-p_0)-3*(q_1-p_1)+8)/16$$

$$\Delta=\text{Clip3}(-t_c,t_c,\Delta)$$

$$p_0'=p_0+\Delta$$

$$q_0'=q_0-\Delta$$

$$\Delta p=\text{Clip3}(-t_c/2,t_c/2,((p_2+p_0+1)/2-p_1+\Delta)/2)$$

$$p_1'=p_1+\Delta p$$

$$\Delta q=\text{Clip}(-t_c/2,t_c/2,((q_2+q_0+1)/2-q1-\Delta)/2)$$

$$q_1'=q_1+\Delta q$$

In FIG. 14B, the weak deblocking filter modifies two samples on either side of the edge because of the smoothness on both sides of the edge.

Furthermore, in FIG. 14B, the white circles indicate sample values after the video coder has applied a conventional strong deblocking filter to the luma samples. The strong deblocking filter may be expressed as:

$$p_0'=(p_2+2*p_1+2*p_0+2*q_0+q_1+4)/8$$

$$p_1'=(p_2+p_1+p_0+q_0+2)/4$$

$$p_2'=(2*p_3+3*p_2+p_1+p_0+q_0+4)/8$$

$$q_0'=(p_1+2*p_0+2*q_0+2*q_1+q_2+4)/8$$

$$q_1'=(p_0+q_0+q_1+q_2+2)/4$$

$$q_2'=(p_0+q_0+q_1+3*q_2+2*q_3+4)/8$$

As shown in FIG. 14B, applying the strong deblocking filter may modify up to three luma samples on either side of the edge. Likewise applying the weak deblocking filter may modify up to two luma samples on either side of the edge. Furthermore, as shown in FIG. 14B, the difference between applying the strong deblocking filter of FIG. 14B and the weak deblocking filter of FIG. 14B may be relatively small. This may mean that the weak deblocking filter of FIG. 14B may be too strong.

In FIG. 14C, the video coder has applied the following weak deblocking filter to the luma samples:

$$\Delta=(3*(q0-p0)-(q1-p1)+4)/8$$

$$\Delta=\text{Clip3}(-t_c,t_c,\Delta)$$

$$p0'=p0+\Delta$$

$$q0'=q0-\Delta$$

$$\Delta p=\text{Clip3}(-t_c/2,t_c/2,((p2+p0+1)/2-p1+\Delta)/2)$$

$$p1'=p1+\Delta p$$

$$\Delta q=\text{Clip}(-t_c/2,t_c/2,((q2+q0+1)/2-q1-\Delta)/2)$$

$$q1'=q1+\Delta q$$

Applying the weak deblocking filter of FIG. 14C may be advantageous over applying the weak deblocking filter of FIG. 14B for several reasons. For example, if the video coder selected the weak deblocking filter for the edge, an edge discontinuity check (e.g., $|p_{0,i}-q_{0,i}|<((5 \cdot t_c+1)/2))$ is false. Accordingly, it may be appropriate for the weak deblocking filter to preserve some of the profile of the edge. In contrast, the weak deblocking filter of FIG. 14B may smooth the samples into an almost straight line.

In another example, in the weak deblocking filter of FIG. 14C, the video coder may use only a single multiplication operation to calculate Δ and may determine, based on Δ, modified values of the luma samples associated with the edge.

Because the video coder only uses a single multiplication operation to calculate Δ, it may be less computationally complex for the video coder to compute the value of Δ in the weak deblocking filter of FIG. 14C than the value of Δ in the weak deblocking filter of FIG. 14B. The value Δ may indicate the strength of the weak deblocking filter. Determining the value of Δ may be considered to be a third deblocking decision (after determining whether to apply a deblocking filter and after determining whether to apply a strong or weak deblocking filter.) Differences between sample values (e.g., q0–p0) may be step discontinuities.

In some examples, the video coder may use the weak deblocking filter of FIG. 14C for chroma samples as well as luma samples. As a result, the modified chroma values do not overshoot the linear slope. In addition, because the video coder may use the same weak deblocking filter for luma and chroma samples, the video coder may be able to reuse the same hardware to apply the weak deblocking filter to both luma and chroma samples.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of coding video data, the method comprising:
associating, without determining whether an edge between a first video block and a second video block is a coding unit (CU) edge, a first boundary strength value with the edge in response to determining that the first video block or the second video block is associated with an intra-predicted CU;
associating a second boundary strength value with the edge in response to determining that the first video block and the second video block are not associated with an intra-predicted CU and that the first video block or the second video block is associated with a transform unit (TU) with a non-zero transform coefficient level;
associating either the second boundary strength value or a third boundary strength value with the edge when the first video block and the second video block are not associated with an intra-predicted CU and the first video block and the second video block are not associated with a TU with a non-zero transform coefficient level, wherein the second boundary strength value is associated with the edge when one or more of the following additional conditions are satisfied:
the first video block and the second video block are associated with different reference pictures or are associated with different numbers of motion vectors,
the first video block and the second video block are each associated with one motion vector and the absolute value of the difference between horizontal dimension components of the motion vectors associated with the first video block and the second video block is greater than or equal to one,
the first video block and the second video block are each associated with one motion vector and the absolute value of the difference between vertical dimension components of the motion vectors associated with the first video block and the second video block is greater than or equal to one,
the first video block and the second video block are each associated with two motion vectors and, for at least one pair of the motion vectors associated with the first video block and the second video block, the absolute value of the difference between horizontal dimension components of the motion vectors in the pair is greater than or equal to one, and the first video block and the second video block are each associated with two motion vectors and, for at least one pair of the motion vectors associated with the first video block and the second video block, the absolute value of the difference between vertical dimension components of the motion vectors in the pair is greater than or equal to one; and applying one or more deblocking filters to samples associated with the edge when the edge is associated with the first boundary strength value or the second boundary strength value, but not the third boundary strength value.

2. The method of claim 1, wherein the first boundary strength value is equal to two, the second boundary strength value is equal to one, and the third boundary strength value is equal to zero.

3. The method of claim 1, wherein applying the one or more deblocking filters comprises:
applying a deblocking filter to chroma samples associated with the edge when the edge is associated with the first boundary strength value; and
applying a deblocking filter to luma samples associated with the edge when the edge is associated with the first boundary strength value or the second boundary strength value.

4. The method of claim 3, wherein the method further comprises:
determining a first threshold value and a second threshold value based on a deblocking quantization parameter (QP) value and based on whether the first or the second boundary strength value is associated with the edge;
determining whether the first or the second threshold values is equal to zero; and
applying no deblocking filter to the luma samples associated with the edge when either the first or the second threshold value is equal to zero, and
wherein applying the deblocking filter to the luma samples associated with the edge comprises applying the deblocking filter to the luma samples associated with the edge when the edge is associated with the first or second boundary strength value and neither the first or the second threshold value is equal to zero.

5. The method of claim 3, wherein applying the deblocking filter to the luma samples associated with the edge comprises:
using only a single multiplication operation to calculate a delta value, wherein the calculation comprises multiplying a step discontinuity across the edge by a constant; and
determining, based on the delta value, modified values of the luma samples associated with the edge, wherein the determining includes respectively adding and subtracting the delta value to luma samples of the first and second video blocks at the edge.

6. The method of claim 3,
wherein the edge is eight luma samples in height or width, the eight luma samples divided equally into a first edge segment and a second edge segment, and
wherein the method further comprises:
determining, based on a third line of samples that crosses the edge, whether to apply a first deblocking filter or a second deblocking filter to luma samples associated with the first edge segment, wherein the first deblocking filter modifies up to three luma samples on either side of the edge and the second deblocking filter modifies up to two luma samples on either side of the edge; and determining, based on a sixth line of samples that crosses the edge, whether to apply a third deblocking filter or a fourth deblocking filter to luma samples associated with the second edge segment, wherein the third deblocking filter modifies up to three luma samples on either side of the edge and the fourth deblocking filter modifies up to two luma samples on either side of the edge.

7. The method of claim 3,
wherein the edge is a chroma edge and the method further comprises determining whether the chroma edge is associated with an I-slice, the chroma edge being associated with the I-slice if the chroma edge is associated with a CU that is in the I-slice, and
wherein applying the deblocking filter to the chroma samples associated with the chroma edge comprises applying the deblocking filter to the chroma samples associated with the chroma edge only when the chroma edge is associated with the I-slice and the chroma edge is associated with the first boundary strength value.

8. The method of claim 3, further comprising:
identifying transform unit (TU) and prediction unit (PU) edges of an N×N grid, wherein a size of a luminance video block is 2N×2N or larger;
determining whether a chroma video block has a size larger than N samples by N samples;
wherein applying the deblocking filter to chroma samples comprises:
applying, when the chroma video block has a size smaller than or equal to N samples by N samples, the deblocking filter to the chroma samples associated with the edge; and
when the chroma video block has a size larger than N samples by N samples, turning the deblocking filter off for edges of the grid that are internal to the chroma video block.

9. The method of claim 1, wherein the method comprises a method of video decoding, the method further comprising:
receiving a bitstream;
generating a predicted video block and a residual video block based on syntax elements in the bitstream; and
generating the first video block based on the predicted video block and the residual video block.

10. The method of claim 1, wherein the method comprises a method of video encoding, the method further comprising:
after applying the one or more deblocking filters to the samples associated with the edge, generating a predicted video block based at least in part on the samples associated with the edge; and
outputting a bitstream that includes one or more syntax elements whose values are based at least in part on the predicted video block.

11. A video coding apparatus comprising:
a data storage medium configured to store video data comprising a first video block and a second video block; and
one or more processors configured to:
associate, without determining whether an edge between the first video block and the second video block is a coding unit (CU) edge, a first boundary strength value with the edge in response to determining that the first video block or the second video block is associated with an intra-predicted CU of the video data;

associate a second boundary strength value with the edge in response to determining that the first video block and the second video block are not associated with an intra-predicted CU and that the first video block or the second video block is associated with a transform unit (TU) with a non-zero transform coefficient level;

associate either the second boundary strength value or a third boundary strength value with the edge when the first video block and the second video block are not associated with an intra-predicted CU and the first video block and the second video block are not associated with a TU with a non-zero transform coefficient level, wherein the second boundary strength value is associated with the edge when one or more of the following additional conditions are satisfied:

the first video block and the second video block are associated with different reference pictures or are associated with different numbers of motion vectors, the first video block and the second video block are each associated with one motion vector and the absolute value of the difference between horizontal dimension components of the motion vectors associated with the first video block and the second video block is greater than or equal to one, the first video block and the second video block are each associated with one motion vector and the absolute value of the difference between vertical dimension components of the motion vectors associated with the first video block and the second video block is greater than or equal to one, the first video block and the second video block are each associated with two motion vectors and, for at least one pair of the motion vectors associated with the first video block and the second video block, the absolute value of the difference between horizontal dimension components of the motion vectors in the pair is greater than or equal to one, and the first video block and the second video block are each associated with two motion vectors and, for at least one pair of the motion vectors associated with the first video block and the second video block, the absolute value of the difference between vertical dimension components of the motion vectors in the pair is greater than or equal to one; and apply one or more deblocking filters to samples stored in the data storage medium and associated with the edge when the edge is associated with the first boundary strength value or the second boundary strength value, but not the third boundary strength value.

12. The video coding apparatus of claim 11, wherein the first boundary strength value is equal to two, the second boundary strength value is equal to one, and the third boundary strength value is equal to zero.

13. The video coding apparatus of claim 11, wherein the one or more processors are configured to:

apply a deblocking filter to chroma samples associated with the edge when the edge is associated with the first boundary strength value; and apply a deblocking filter to luma samples associated with the edge when the edge is associated with the first boundary strength value or the second boundary strength value.

14. The video coding apparatus of claim 13, wherein the one or more processors are further configured to:

determine a first threshold value and a second threshold value based on a deblocking quantization parameter (QP) value and based on whether the first or the second boundary strength value is associated with the edge;

determine whether the first or the second threshold values is equal to zero;

apply no deblocking filter to the luma samples associated with the edge when either the first or the second threshold value is equal to zero; and apply the deblocking filter to the luma samples associated with the edge when the edge is associated with the first or second boundary strength value and neither the first or the second threshold value is equal to zero.

15. The video coding apparatus of claim 13, wherein the one or more processors are configured to:

use only a single multiplication operation to calculate a delta value, wherein the calculation comprises multiplying a step discontinuity across the edge by a constant; and determine, based on the delta value, modified values of the luma samples associated with the edge, wherein the determining includes respectively adding and subtracting the delta value to luma samples of the first and second video blocks at the edge.

16. The video coding apparatus of claim 13, wherein the edge is eight luma samples in height or width, the eight luma samples divided equally into a first edge segment and a second edge segment; and wherein the one or more processors are configured to:

determine, based on a third line of samples that crosses the edge, whether to apply a first deblocking filter to luma samples associated with the first edge segment;

determine, based on a sixth line of samples that crosses the edge, whether to apply the first deblocking filter to luma samples associated with the second edge segment;

apply, based on the determination whether to apply the first deblocking filter to the luma samples associated with the first edge segment, the first deblocking filter or a second deblocking filter to the luma samples associated with the first edge segment, wherein the first deblocking filter modifies up to three luma samples on either side of the edge and the second deblocking filter modifies up to two luma samples on either side of the edge; and apply, based on the determination whether to apply the first deblocking filter to the luma samples associated with the second edge segment, the first deblocking filter or the second deblocking filter to the luma samples associated with the second edge segment.

17. The video coding apparatus of claim 13, wherein the edge is a chroma edge and the one or more processors are configured to:

determine whether the chroma edge is associated with an I-slice; and apply the deblocking filter to the chroma samples associated with the chroma edge only when the chroma edge is associated with an I-slice and the chroma edge is associated with the first boundary strength value.

18. The video coding apparatus of claim 13, wherein the one or more processors are configured to:

determine whether the edge corresponds to an external edge of a 32×32 transform unit (TU); and apply the deblocking filter to the chroma samples associated with the edge only when the edge corresponds to an external edge of the 32×32 TU and the edge is associated with the first boundary strength value.

19. The video coding apparatus of claim 11, further comprising a display configured to display a picture that includes the first video block, wherein the one or more processors are configured to:
receive a bitstream;
generate a predicted video block and a residual video block based on syntax elements in the bitstream; and
generate the first video block based on the predicted video block and the residual video block.

20. The video coding apparatus of claim 19, further comprising a display configured to display decoded video data including the first video block.

21. The video coding apparatus of claim 11, further comprising a camera configured to capture a picture that includes the first video block, wherein the one or more processors are configured to:
generate, after applying the deblocking filter to the samples associated with the edge, a predicted video block based at least in part on the samples associated with the edge; and
output a bitstream that includes one or more syntax elements whose values are based at least in part on the predicted video block.

22. The video coding apparatus of claim 11, wherein the video coding apparatus comprises at least one of:
an integrated circuit;
a microprocessor; or
a wireless handset.

23. The video coding apparatus of claim 11, further comprising a camera configured to capture the video data.

24. A video coding apparatus that comprises:
means for associating, without determining whether an edge between a first video block and a second video block is a coding unit (CU) edge, a first boundary strength value with the edge in response to determining that the first video block or the second video block is associated with an intra-predicted CU;
means for associating a second boundary strength value with the edge in response to determining that the first video block and the second video block are not associated with an intra-predicted CU and that the first video block or the second video block is associated with a transform unit (TU) with a non-zero transform coefficient level;
means for associating either the second boundary strength value or a third boundary strength value with the edge when the first video block and the second video block are not associated with an intra-predicted CU and the first video block and the second video block are not associated with a TU with a non-zero transform coefficient level, wherein the second boundary strength value is associated with the edge when one or more of the following additional conditions are satisfied:
the first video block and the second video block are associated with different reference pictures or are associated with different numbers of motion vectors,
the first video block and the second video block are each associated with one motion vector and the absolute value of the difference between horizontal dimension components of the motion vectors associated with the first video block and the second video block is greater than or equal to one,
the first video block and the second video block are each associated with one motion vector and the absolute value of the difference between vertical dimension components of the motion vectors associated with the first video block and the second video block is greater than or equal to one,
the first video block and the second video block are each associated with two motion vectors and, for at least one pair of the motion vectors associated with the first video block and the second video block, the absolute value of the difference between horizontal dimension components of the motion vectors in the pair is greater than or equal to one, and
the first video block and the second video block are each associated with two motion vectors and, for at least one pair of the motion vectors associated with the first video block and the second video block, the absolute value of the difference between vertical dimension components of the motion vectors in the pair is greater than or equal to one; and
means for applying one or more deblocking filters to samples associated with the edge when the edge is associated with the first boundary strength value or the second boundary strength value, but not the third boundary strength value.

25. The video coding apparatus of claim 24, wherein the first boundary strength value is equal to two, the second boundary strength value is equal to one, and the third boundary strength value is equal to zero.

26. The video coding apparatus of claim 24, wherein the means for applying the one or more deblocking filters comprises:
means for applying a deblocking filter to chroma samples associated with the edge when the edge is associated with the first boundary strength value; and
means for applying a deblocking filter to luma samples associated with the edge when the edge is associated with the first boundary strength value or the second boundary strength value.

27. The video coding apparatus of claim 26,
wherein the video coding apparatus further comprises:
means for determining a first threshold value and a second threshold value based on a deblocking quantization parameter (QP) value and based on whether the first or the second boundary strength value is associated with the edge;
means for determining whether the first or the second threshold values is equal to zero; and
means for applying no deblocking filter to the luma samples associated with the edge when either the first or the second threshold value is equal to zero; and
wherein the means for applying the deblocking filter to the luma samples associated with the edge comprises means for applying the deblocking filter to the luma samples associated with the edge when the edge is associated with the first or second boundary strength value and neither the first or the second threshold value is equal to zero.

28. The video coding apparatus of claim 26, wherein the means for applying the deblocking filter to the luma samples associated with the edge comprises:
means for using only a single multiplication operation to calculate a delta value, wherein the calculation comprises multiplying a step discontinuity across the edge by a constant; and
means for determining, based on the delta value, modified values of the luma samples associated with the edge, wherein the determining includes respectively adding and subtracting the delta value to luma samples of the first and second video blocks at the edge.

29. The video coding apparatus of claim 26,
wherein the edge is eight luma samples in height or width, the eight luma samples divided equally into a first edge segment and a second edge segment; and
wherein the video coding apparatus further comprises:
means for determining, based on a third line of samples that crosses the edge, whether to apply a first deblocking filter or a second deblocking filter to luma samples associated with the first edge segment, wherein the first deblocking filter modifies up to three luma samples on either side of the edge and the second deblocking filter modifies up to two luma samples on either side of the edge; and
means for determining, based on a sixth line of samples that crosses the edge, whether to apply a third deblocking filter or a fourth deblocking filter to luma samples associated with the second edge segment, wherein the third deblocking filter modifies up to three luma samples on either side of the edge and the fourth deblocking filter modifies up to two luma samples on either side of the edge.

30. The video coding apparatus of claim 26,
wherein the edge is a chroma edge and the video coding apparatus further comprises means for determining whether the chroma edge is associated with an I-slice, the chroma edge being associated with the I-slice if the chroma edge is associated with a CU that is in the I-slice, and
wherein the means for applying the deblocking filter to the chroma samples associated with the chroma edge comprises means for applying the deblocking filter to the chroma samples associated with the chroma edge only when the chroma edge is associated with the I-slice and the chroma edge is associated with the first boundary strength value.

31. The video coding apparatus of claim 26, wherein the video coding apparatus further comprises:
means for identifying transform unit (TU) and prediction unit (PU) edges of an N×N grid, wherein a size of a luminance video block is 2N×2N or larger;
means for determining whether a chroma video block has a size larger than N samples by N samples;
wherein the means for applying a deblocking filter to chroma samples comprises:
means for applying, when the chroma video block has a size smaller than or equal to N samples by N samples, the deblocking filter to the chroma samples associated with the edge; and
means for turning, when the chroma video block has a size larger than N samples by N samples, the deblocking filter off for edges of the grid that are internal to the chroma video block.

32. The video coding apparatus of claim 24, wherein the video coding apparatus comprises a video decoding apparatus further comprising:
means for receiving a bitstream;
means for generating a predicted video block and a residual video block based on syntax elements in the bitstream; and
means for generating the first video block based on the predicted video block and the residual video block.

33. The video coding apparatus of claim 24, wherein the video coding apparatus comprises a video encoding apparatus comprising:
means for generating, after applying the one or more deblocking filters to the samples associated with the edge, a predicted video block based at least in part on the samples associated with the edge; and
means for outputting a bitstream that includes one or more syntax elements whose values are based at least in part on the predicted video block.

34. A computer program product that comprises one or more non-transitory computer-readable storage media that store computer-executable instructions that, when executed, cause one or more processors to:
associate, without determining whether an edge between a first video block and a second video block is a coding unit (CU) edge, a first boundary strength value with the edge in response to determining that the first video block or the second video block is associated with an intra-predicted CU;
associate a second boundary strength value with the edge in response to determining that the first video block and the second video block are not associated with an intra-predicted CU and that the first video block or the second video block is associated with a transform unit (TU) with a non-zero transform coefficient level;
associate either the second boundary strength value or a third boundary strength value with the edge when the first video block and the second video block are not associated with an intra-predicted CU and the first video block and the second video block are not associated with a TU with a non-zero transform coefficient level, wherein the second boundary strength value is associated with the edge when one or more of the following additional conditions are satisfied:
the first video block and the second video block are associated with different reference pictures or are associated with different numbers of motion vectors,
the first video block and the second video block are each associated with one motion vector and the absolute value of the difference between horizontal dimension components of the motion vectors associated with the first video block and the second video block is greater than or equal to one,
the first video block and the second video block are each associated with one motion vector and the absolute value of the difference between vertical dimension components of the motion vectors associated with the first video block and the second video block is greater than or equal to one,
the first video block and the second video block are each associated with two motion vectors and, for at least one pair of the motion vectors associated with the first video block and the second video block, the absolute value of the difference between horizontal dimension components of the motion vectors in the pair is greater than or equal to one, and
the first video block and the second video block are each associated with two motion vectors and, for at least one pair of the motion vectors associated with the first video block and the second video block, the absolute value of the difference between vertical dimension components of the motion vectors in the pair is greater than or equal to one; and
apply one or more deblocking filters to samples associated with the edge when the edge is associated with the first boundary strength value or the second boundary strength value, but not the third boundary strength value.

* * * * *